(12) United States Patent
Ajellal et al.

(10) Patent No.: US 11,279,781 B2
(45) Date of Patent: Mar. 22, 2022

(54) CATALYST SYSTEM FOR PRODUCING POLYETHYLENE COPOLYMERS IN A HIGH TEMPERATURE SOLUTION POLYMERIZATION PROCESS

(71) Applicant: BOREALIS AG, Vienna (AT)

(72) Inventors: Noureddine Ajellal, Helsinki (FI); Anna Fait, Neuhofen an der Krems (AT); Luigi Resconi, Neuhofen an der Krems (AT)

(73) Assignee: Borealis AG, Vienna (AT)

( * ) Notice: Subject to any disclaimer, the term of this patent is extended or adjusted under 35 U.S.C. 154(b) by 175 days.

(21) Appl. No.: 16/469,617

(22) PCT Filed: Dec. 12, 2017

(86) PCT No.: PCT/EP2017/082434
§ 371 (c)(1),
(2) Date: Jun. 13, 2019

(87) PCT Pub. No.: WO2018/108918
PCT Pub. Date: Jun. 21, 2018

(65) Prior Publication Data
US 2020/0079887 A1 Mar. 12, 2020

(30) Foreign Application Priority Data
Dec. 15, 2016 (EP) .................................. 16204328

(51) Int. Cl.
*C08F 4/6592* (2006.01)
*C08F 210/16* (2006.01)
*C07F 17/00* (2006.01)

(52) U.S. Cl.
CPC ............ *C08F 210/16* (2013.01); *C07F 17/00* (2013.01); *C08F 4/65927* (2013.01); *C08F 2420/01* (2013.01)

(58) Field of Classification Search
CPC .............................. C08F 4/65927; C07F 17/00
See application file for complete search history.

(56) References Cited

U.S. PATENT DOCUMENTS

| | | | |
|---|---|---|---|
| 5,571,880 A | 11/1996 | Alt et al. |
| 6,057,408 A | 5/2000 | Winter et al. |
| 6,252,019 B1 | 6/2001 | Ewen et al. |
| 6,939,928 B1 | 9/2005 | Kawai et al. |
| 7,452,946 B2 | 11/2008 | Matsuura et al. |

(Continued)

FOREIGN PATENT DOCUMENTS

| | | |
|---|---|---|
| CN | 1109472 A | 10/1995 |
| CN | 1327448 A | 12/2001 |

(Continued)

OTHER PUBLICATIONS

Busico et al. Microstructure of polypropylene, Process in Polymer Science, 2001, 26(3), 443-533.
Busico et al. Full Assignment of the $^{13}$NMR Spectra of Regioregular Polypropylenes: Methyl and Methylene Region, Macromolecules 1997, 30(20), 6251-6263.
Busico et al., Alk-1-ene Polymerization in the Presence of a Monocyclopentadienyl Zirconium(IV) Actamidinate Catalyst Microstructural and Mechanistic Insights, Macromol. Rapid Commun, vol. 28, 2007, pp. 1128-1134.
Castignolles et al., Detection and quantification of branching in polyacrylates by size-exclusion chromatography (SEC) and melt-state $^{13}$C NMR spectroscopy, Polymer 50 (2009) 2373-83.
Chukanova, et al., "Polymerization of propylene using isospecific rac-Me2Si(2-Me,4-Phlnd)2ZrCl2 catalyst immobilized on polyethylene with grafted poly(acrylic acid)", Polymer science. Series A, Chemistry, physics 43.8 (2001): 787-792.

(Continued)

*Primary Examiner* — Caixia Lu
(74) *Attorney, Agent, or Firm* — Meunier Carlin & Curfman LLC

(57) ABSTRACT

Catalyst system for producing ethylene copolymers in a high temperature solution process, the catalyst system comprising:
(i) a metallocene complex of formula (I)

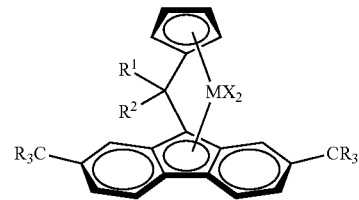

wherein
M is Hf or a mixture with Zr, provided that more than 50% by moles of the complex of Formula I has M=Hf;
X is a sigma ligand;
R are the same or different from each other and can be saturated linear or branched $C_1$-$C_{10}$ alkyl, $C_6$-$C_{10}$ aryl, $C_4$-$C_{10}$ heteroaryl, $C_6$-$C_{20}$ alkylaryl or $C_6$-$C_{20}$ arylalkyl groups, which can optionally contain up to 2 heteroatoms or silicon atoms;
$R^1$ is a $C_6$-$C_{10}$ aryl or $C_6$-$C_{20}$ alkylaryl group optionally containing up to 2 heteroatoms or silicon atoms or a $C_4$-$C_{10}$ heteroaryl group;
$R^2$ is a $C_4$-$C_{20}$ cycloalkyl group, optionally carrying alkyl substituents in beta-positions, of formula (II)

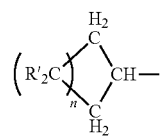

in which R' can be the same or can be different from each other and can be hydrogen or is defined as R and n is 1 to 17; and
(ii) a boron containing cocatalyst.

10 Claims, 2 Drawing Sheets

(56) References Cited

U.S. PATENT DOCUMENTS

| | | | |
|---|---|---|---|
| 8,138,113 B2 | 3/2012 | Yang et al. | |
| 9,284,442 B2 | 3/2016 | Hoslet et al. | |
| 9,334,350 B2 | 5/2016 | McDaniel et al. | |
| 2005/0288461 A1 | 12/2005 | Jensen et al. | |
| 2006/0116303 A1 | 6/2006 | Limura et al. | |
| 2006/0161013 A1* | 7/2006 | Tohi | C08F 10/00 556/11 |
| 2014/0206819 A1 | 7/2014 | Hafner et al. | |
| 2017/0037164 A1 | 2/2017 | Ajellal et al. | |
| 2017/0037165 A1 | 2/2017 | Ajellal et al. | |
| 2018/0320102 A1* | 11/2018 | Hayakawa | C10M 143/02 |

FOREIGN PATENT DOCUMENTS

| | | |
|---|---|---|
| CN | 1791619 A | 6/2006 |
| CN | 103339158 B | 2/2017 |
| EP | 1858907 B1 | 10/2008 |
| EP | 2511305 B1 | 10/2012 |
| EP | 2532687 A2 | 12/2012 |
| EP | 2722346 A1 | 4/2014 |
| EP | 2729529 B1 | 4/2016 |
| EP | 1548018 B1 | 10/2018 |
| EP | 2813517 B2 | 6/2019 |
| WO | 94014856 A1 | 7/1994 |
| WO | 95012622 A1 | 5/1995 |
| WO | 9714727 A1 | 4/1997 |
| WO | 98040331 A1 | 9/1998 |
| WO | 0009515 A1 | 2/2000 |
| WO | 00024792 A1 | 5/2000 |
| WO | 00024793 A1 | 5/2000 |
| WO | 02002576 A1 | 1/2002 |
| WO | 03049856 A1 | 6/2003 |
| WO | 03051934 A2 | 6/2003 |
| WO | 03102042 A1 | 12/2003 |
| WO | 2006069733 A1 | 7/2006 |
| WO | 2006097497 A1 | 9/2006 |
| WO | 2007116034 A1 | 10/2007 |
| WO | 2007122098 A1 | 11/2007 |
| WO | 2010052260 A1 | 5/2010 |
| WO | 2010052263 A1 | 5/2010 |
| WO | 2010052264 A1 | 5/2010 |
| WO | 2011076443 A1 | 6/2011 |
| WO | 2011076780 A1 | 6/2011 |
| WO | 2011135004 A2 | 11/2011 |
| WO | 2011135005 A2 | 11/2011 |
| WO | 2012001051 A1 | 1/2012 |
| WO | 2012001052 A1 | 1/2012 |
| WO | 2012075560 A1 | 6/2012 |
| WO | 2012084961 A1 | 6/2012 |
| WO | 2013007650 A1 | 1/2013 |
| WO | 2014096171 A1 | 6/2014 |
| WO | 2015158790 A1 | 10/2015 |
| WO | 2015158791 A2 | 10/2015 |
| WO | 2016038210 A1 | 3/2016 |
| WO | 2016038211 A1 | 3/2016 |
| WO | 2016114914 A1 | 7/2016 |
| WO | 2018091684 A1 | 5/2018 |

OTHER PUBLICATIONS

Ewen, et al., "Evaluation of the dimethylsilyl-bis(2-methyl-4-phenyl-1-indenyl) ligand with group 4 triad metals in propene polymerizations with methylaluminoxane", Macromolecular Rapid Communications vol. 19, Issue 1, Jan. 1998, pp. 71-73.

Filip, et al., "Heteronuclear decoupling under fast MAS by a rotor-synchronized Hahn-echo pulse train", Journal of Magnetic Resonance, vol. 176, Issue 2, Oct. 2005, pp. 239-243.

Griffin, et al., "Low-load rotor-synchronised Hahn-echo pulse train (RS-HEPT) 1H decoupling in solid-state NMR: factors affecting MAS spin-echo dephasing times.", Mag. Res. in Chem. 2007 45, S1, S198.

Hasegawa et al. High-temperature ethylene/alpha-olefin copolymerization with a zirconene catalyst: Effects of the zirconene ligand and polymerization conditions on copolymerization behavior, Journal of Polymer Science: Part A; Polymer Chemistry, 2000, 38, 4641-4648.

Hintermann, et al., Beilstein J. Org. Chem. 2007, 3, 1-5.

Hopf et al. Highly syndiotactic polypropene with $C_s$-symmetric metallocene/MAO catalysts. Catalysis Communications, 2002, 2, 459.

Kaminsky et al. Polymerization of Ethene and Longer Chained Olefins by Metallocene Catalysis, Macromol Symp 2005, 226, 25.

Kim et al. Ethylene/1-Hexene Copolymerizations of Syndioselective Metallocenes: Direct Comparison of $Me_2C(Cp)(Flu)ZrMe_2$ with $Et(Cp)(Flu)ZrMe_2$, J POlym Sci Part A Polym Chem, 1999, 37, 2763.

Klimke, et al., "Optimisation and Application of Polyolefin Branch Quantification by Melt-State 13C NMR Spectroscopy", Macromolecular Chemistry and Physics vol. 207, Issue 4 Feb. 24, 2006 pp. 382-395.

Liu, et al., "Poly(ethylene-co-1-octene) Characterization by High-Temperature Multidimensional NMR at 750 MHz", Macromolecules 2001, 34, 4757-4767.

Matsubara, et al., "Synthesis and Structures of Nickel Halide Complexes Bearing Mono- and Bis-coordinated N-Heterocyclic Carbene Ligands, Catalyzing Grignard Cross-Coupling Reactions", Organometallics, 2006, 25 (14), pp. 3422-3427.

Parkinson, et al., "Effect of Branch Length on 13C NMR Relaxation Properties in Molten Poly[ethylene-co-(α-olefin)] Model Systems", Macromol. Chem. Phys. 2007;208:2128-2133.

Parkinson, et al., "NMR Spectroscopy of Polymers: Innovative Strategies for Complex Macromolecules, Chapter 24, 401 (2011)".

Pollard, , "Observation of Chain Branching in Polyethylene in the Solid State and Melt via 13C NMR Spectroscopy and Melt NMR Relaxation Time Measurements", Macromolecules, 2004, 37 (3), pp. 813-825.

Qui, et al., "Improved Peak Assignments for the 13C NMR Spectra of Poly(ethylene-co-1-octene)s", Macromolecules 2007, 40, 6879-6884.

Randall, A Review of high resolution liquid $^{13}$ Carbon nuclear magnetic resonance characterizations of ethylene-based polymers, Journal of Macromolecular Science, Reviews in Macromolecular Chemistry and Physics, 1989, C29, 201-317.

Resconi et al. Selectivity in Propene Polymerization with Metallocene Catalysts, Chemical Reviews, 2000, 100, 1253-1346.

Song et al. Synthesis of aryl-substituted indanones and indenes via a highly efficicent ligand-free palladium-catalyzed Suzuki coupling process, ARKIOVIC, 2016, 4, 306-327.

Stadler et al. Influence of Type and Content of Various Comonomers on Long-Chain Branching of Ethene/alpha-olefin Copolymers, Macromolecules, 2006, 39, 1474.

Stork, et al., "The Stereochemistry of the SN2' Reaction. I. Preparation of Pure trans-6-Alkyl-2-cyclohexen-1-ols", J. Am. Chem. Soc. 1956, 78, 4604-4608.

Tynys et al. Propykene polymerisations with novel heterogeneous combination metallocene catalyst systems, Polymer, 2007, 48, 1893-1902.

Ushakova, et al., Ethylene polymerization and ethylene-1-hexene copolymerization over immobilized metallocene catalysts, Kinetics and Catalysis, Feb. 2012, vol. 53, Issue 1, pp. 75-83.

Wang, et al., "Long Chain Branching in Ethylene Polymerization Using Binary Homogeneous Metallocene Catalyst System", Polymer Reaction Engineering , vol. 7, 1999—Issue 3, pp. 327-346.

Yano et al. Novel zirconocene catalysts for the production of high molecular weight LLDPE in high-temperature polymerization, Macromolecular Chemistry and Physics, 1999, 200(4), 933-941.

Yano et al. Ethylene/1-hexene copolymerization with $Ph_2C(Cp)(Flu)ZrCl_2$ derivatives: correlation between ligand structure and copolymerization behavior at high temperature, Macromolecular Chemistry and Physics, 1999, 200, 1542.

Yano et al. Effect of ligand structures on high temperature homo- and copolymerization of ethylene by cationic hafnocene catalysts based on tetrakis(pentafluorophenyl)borate, Journal of Molecular Catalysis A: Chemical, 2000, 156(1-2), 133-141.

Zhou, et al., "A new decoupling method for accurate quantification of polyethylene copolymer composition and triad sequence distribution with 13C NMR.", J Magn Reson. Aug. 2007; 187(2):225-33. Epub May 23, 2007.

(56) References Cited

OTHER PUBLICATIONS

International Search Report and Written Opinion dated Mar. 20, 2018 in International Application No. PCT/EP2017/082434 (12 pages).
CHENG. Carbon-13 NMR analysis of ethylene-propylene rubbers, Macromolecules, 1984, 17, 1950-1955.
Gahleitner et al. Crystallinity and mechanical properties of PP-homopolymers as influenced by molecular structure and nucleation, Journal of Applied Polymer Science, 1996, 61(4), 649-657.
Grein et al. Impact modified isotactic polypropylene with controlled rubber intrinsic viscosities: Some new aspects about morphology and fracture, Journal of Applied Polymer Science, 2003, 87(10), 1702-1712.
Kuklin et al. Quantitative structure-property relationships in propene polymerization by zirconocenes with a rac-SiMe$_2$[Ind]$_2$ based ligand frameworks, Journal of Molecular Catalysis A: Chemical, 2016, 412, 39-46.
Premphet et al. Polypropylene/metallocene ethylene-octene copolymer blends with a bimodal particle size distribution: Mechanical properties and their controlling factors, Jounral of Applied Polymer Science, 2002, 85(11), 2412-2418.
SINGH et al. Triad sequence determination of ethylene-propylene copolymers—application of quantitative $^{13}$C NMR, Polymer Testing, 2009, 28(5), 475.
Wang et al. Structural Analysis of Ethylene/Propylene Copolymers Synthesized with a Constrained Geometry Catalyst, Macromolecules, 2000, 33(4), 1157-1162.
Yano, A et al., "Homo- and copolymerization of ethylene by cationic hafnocene catalysts based on tetrakis(pentafluorophenyl)borate", Macromol. Chern. Phys. 1999, 200, 924-932.

\* cited by examiner

Figure 1. Productivity (kg-PO/g-MC) vs. average C8/C2 in liquid phase and vs metallocenes.
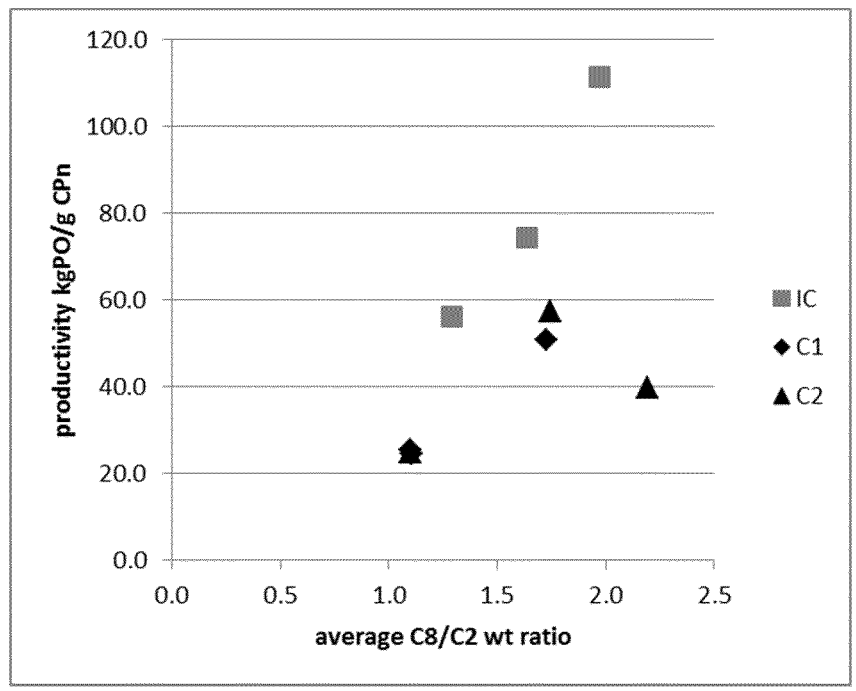
Figure 2. Mw (kDa) vs. C8 content wt% and vs metallocenes.
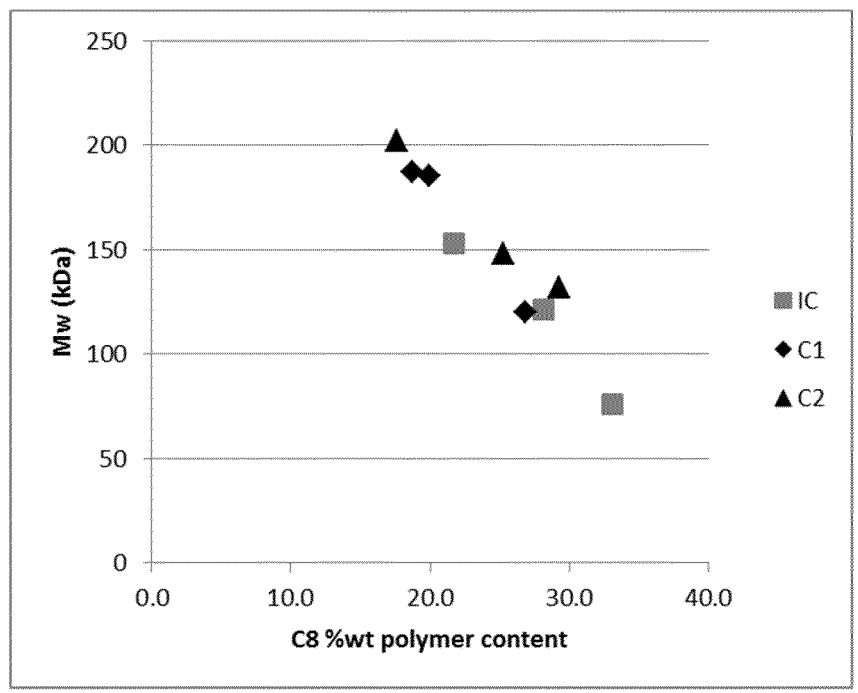

Figure 3. C8 in polymer (wt%) vs. C8/C2 average in liquid phase and vs metallocenes.
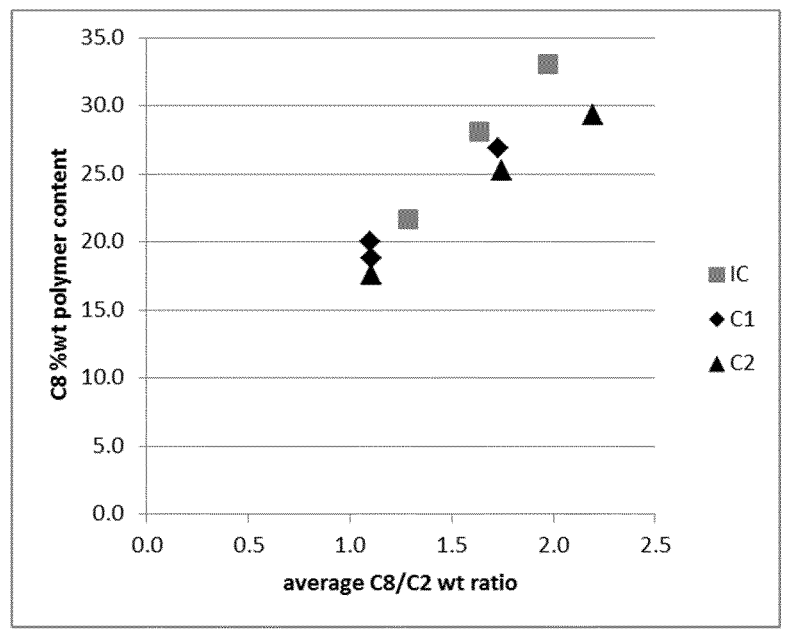
Figure 4. Mw (kDa) vs. average C8/C2 in liquid phase and vs metallocenes
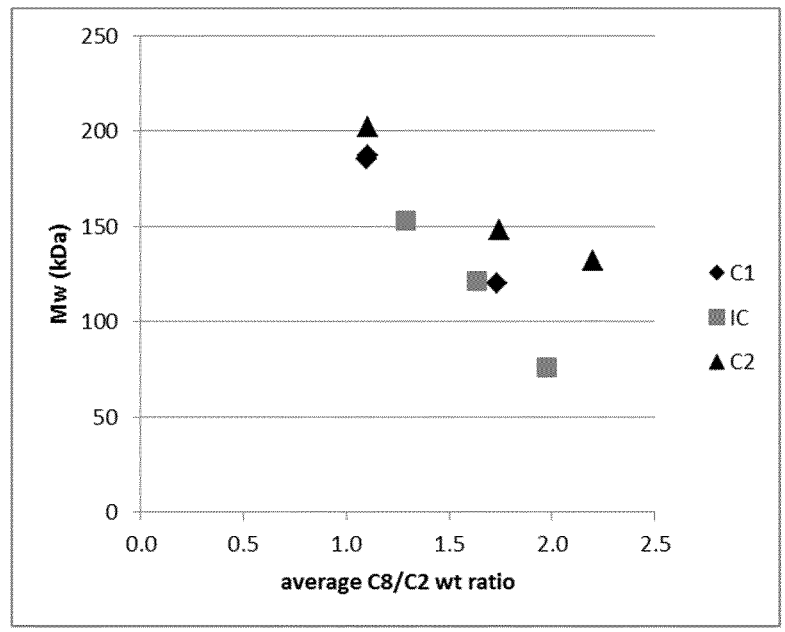

CATALYST SYSTEM FOR PRODUCING POLYETHYLENE COPOLYMERS IN A HIGH TEMPERATURE SOLUTION POLYMERIZATION PROCESS

The present invention is related to a new catalysts system, which is able to produce polyethylene copolymers in a high temperature solution polymerization process. The new catalyst system comprises a specifically substituted, bridged hafnocene catalyst complex, comprising a cyclopentadienyl (Cp) ligand, a fluorenyl (Flu) ligand and a specifically covalent bridge connecting the two ligands, along with a boron based cocatalyst. This combination remarkably gives rise to catalyst systems with high productivity combined with high solubility, molecular weight capability and comonomer incorporation ability.

Metallocene catalysts have been used to manufacture polyolefins for many years. Countless academic and patent publications describe the use of these catalysts in olefin polymerization. Metallocenes are now used industrially and polypropylenes as well as polyethylenes are often produced using cyclopentadienyl based catalyst systems with different substitution patterns.

Several of these metallocene catalysts have been described for the use in solution polymerization for producing polyethylene homo- or copolymers.

For example WO 2000024792 describes a catalyst system comprising hafnocene catalyst complex derived from A) a biscyclopentadienyl hafnium organometallic compound having i) at least one unsubstituted cyclopentadienyl ligand or aromatic fused-ring substituted cyclopentadienyl ligand not having additional substitutents on said ligand, ii) one substituted or unsubstituted, aromatic fused-ring substituted cyclopentadienyl ligand, and iii) a covalent bridge connecting the two cyclopentadienyl ligands.

This bridge can be a single carbon substituted with two aryl groups, each of these aryl groups being substituted with a $C_1$-$C_{20}$ hydrocarbyl or hydrocarbylsilyl group, whereby at least one of these substituents is a linear $C_3$ or greater substitutent.

In addition the catalyst system comprises an activating cocatalyst, which is preferably a precursor ionic compound comprising a halogenated tetraaryl-substituted Group 13 anion.

Also EP 2511305 is related to bridged Cp-Flu metallocene complexes. The C-based bridges shown in the Examples are substituted methylene bridges, whereby the substituents are the same (e.g. dimethyl, diphenyl, dibenzyl, etc.) or are linked together to form a ring (e.g. cyclohexylidene).

Yano and co-workers (literatures 1 to 4) studied the effect of ligand structure on high temperature ethylene homopolymerization and copolymerization with various Cp-Flu metallocenes.

1. A. Yano, M. Sone, S. Hasegawa, M. Sato, A. Akimoto, *Macromol. Chem. Phys.* 1999, 200, 933.
2. A. Yano, S. Hasegawa, T. Kaneko, M. Sone, M. Sato, A. Akimoto, *Macromol. Chem. Phys.* 1999, 200, 1542.
3. A. Yano, M. Sone, S. Yamada, S. Hasegawa, M. Sato, A. Akimoto, *Journal of Molecular Catalysis A: Chemical* 2000, 156, 133.
4. S. Hasegawa, M. Sone, M. Tanabiki, M. Sato, A. Yano, *Journal of Polymer Science: Part A: Polymer Chemistry* 2000, 38, 4641.

The main teachings from this work are:
i) For both the Zr and analogue Hf complexes, in C2 homopolymerization and C2/C6 copolymerization, a $Ph_2C$ bridge provides higher activity and higher Mw compared to a MePhC or $Me_2C$ bridge.
ii) Addition of substituents on the Cp ligand does not significantly change catalyst performance
iii) With Zr as the metal, in C2/C6 copolymerization, addition of methyl or tert-butyl substituents in the 2,7 positions of the Flu ligand increases molecular weight of the copolymer but does not affect comonomer reactivity nor catalyst productivity.
iv) With Hf as the metal, in C2/C6 copolymerization, addition of tert-butyl substituents in the 2,7 positions of the Flu ligand slightly increases catalyst productivity but molecular weight of the copolymer and comonomer reactivity are hardly affected.
v) Zr complexes are more active than Hf complexes, but the $Ph_2C(Cp)(Flu)ZrCl_2$ complex gives lower copolymer Mw compared to its Hf analogue In none of the above cited literatures and patents the combination of high productivity in combination with high solubility, molecular weight capability and comonomer incorporation ability of the catalyst system is mentioned.

Furthermore the above cited literatures and patents do not address the effect of the steric encumbrance of a bridge being composed of C-atom substituted by an aryl group whereas the second substituent being a non-aryl substituent at higher polymerization temperature on the catalyst performance of a Hafnium complex.

However, for a process for producing ethylene copolymers to be efficient, it is important that the catalyst system used fulfils a set of very strict requirements. Comonomer reactivity for higher comonomers (comonomer incorporation), catalyst molecular weight capability (lowest achievable melt index for a given polymer density, monomer concentration and polymerization temperature) and catalyst thermal stability must ensure the production of copolymers with density down to ~0.850 $g/cm^3$ and a melt index $MI_2$ (190° C. 2.16 kg) down to ~0.3 g/10 min with high productivity (in order to get a maximum of polyethylene produced with as low amount of catalyst as possible).

Solubility of the transition metal complex in aliphatic hydrocarbons is also important to ensure optimal use of the complex in a solution process.

Although a lot of work has been done in the field of metallocene catalysts, there still remains a need to find new catalyst systems for ethylene copolymerization, which are able to produce polymers with desired properties and which have high productivity combined with high solubility, molecular weight capability and comonomer incorporation ability.

As a consequence, the inventors set out to develop a new catalyst system having superior polymerization behaviour than the above mentioned polymerization catalyst systems regarding to productivity, solubility, molecular weight capability and comonomer incorporation ability.

The present inventors have now found a new class of olefin polymerization catalyst systems, which are able to solve the problems disclosed above. In particular, the invention combines the use of special metallocene complexes with a boron cocatalyst.

SUMMARY OF INVENTION

Thus, viewed from one aspect the invention relates to a catalyst system for producing ethylene copolymers in a high temperature solution process, the catalyst system comprising (i) a metallocene complex of formula (I)

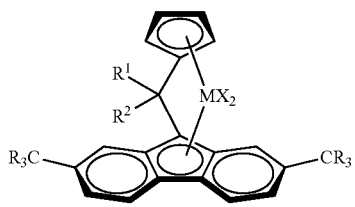

wherein
M is Hf or a mixture with Zr, provided that more than 50% by moles of the complex of Formula I has M=Hf
X is a sigma ligand
R are the same or different from each ether and can be saturated linear or branched $C_1$-$C_{10}$ alkyl, $C_6$-$C_{10}$ aryl, $C_4$-$C_{10}$ heteroaryl, $C_6$-$C_{20}$ alkylaryl or $C_6$-$C_{20}$ arylalkyl groups, which can optionally contain up to 2 heteroatoms or silicon atoms
$R^1$ is a $C_6$-$C_{10}$ aryl or $C_6$-$C_{20}$ alkylaryl group optionally containing up to 2 heteroatoms or silicon atoms or a $C_4$-$C_{10}$ heteroaryl group
$R^2$ is a $C_4$-$C_{20}$ cycloalkyl group, optionally carrying alkyl substituents in beta-positions, of formula (II)

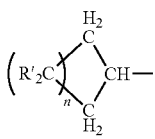

in which R' can be the same or can be different from each other and can be hydrogen or is defined as R and n is 1 to 17
and
(ii) a boron containing cocatalyst Viewed from another aspect the invention provides a process for the preparation of an ethylene copolymer comprising polymerizing ethylene and a $C_{4-10}$ alpha-olefin comonomer in a high temperature solution process at a temperature greater than 100° C. in the presence of a catalyst comprising:
(i) a metallocene complex of formula (I) as defined above and
(ii) a boron containing cocatalyst.

Viewed from a further aspect the invention provides an ethylene copolymer made by a process as hereinbefore defined.

BRIEF DESCRIPTION OF FIGURES

FIG. 1. Productivity (kg-PO/g-MC) vs. average C8/C2 in liquid phase and vs. metallocenes.

FIG. 2. Mw (kDa) vs. C8 content wt % and vs metallocenes.

FIG. 3. C8 in polymer (wt %) vs. C8/C2 average in liquid phase and vs metallocenes.

FIG. 4. Mw (kDa) vs. average in liquid phase and vs metallocenes.

DETAILED DESCRIPTION OF THE INVENTION

Metallocene Complex

The single site metallocene complex, especially the complexes defined by the formula (I) specified in the present invention, used for manufacture of the ethylene copolymer are asymmetrical, meaning that the two ligands forming the metallocene complex are different.

The invention can be effected with a metallocene complex of formula (I)

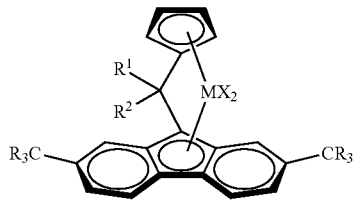

wherein
M is Hf or a mixture with Zr, provided that more than 50% by moles of the complex of Formula I has M=Hf
X is a sigma ligand
R are the same or different from each other and can be saturated linear or branched $C_1$-$C_{10}$ alkyl, $C_5$-$C_{10}$ aryl, $C_6$-$C_{20}$ alkylaryl or $C_6$-$C_{20}$ arylalkyl groups, which can optionally contain up to 2 heteroatoms or silicon atoms
$R^1$ is a $C_6$-$C_{10}$ aryl or $C_6$-$C_{20}$ alkylaryl group optionally containing up to 2 heteroatoms or silicon atoms or a $C_4$-$C_{10}$ heteroaryl group
$R^2$ is a $C_4$-$C_{20}$ cycloalkyl group, optionally carrying alkyl substituents in beta-positions, of formula (II)

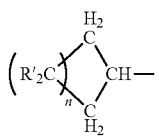

in which R' can be the same or can be different from each other and can be hydrogen or is defined as R and n is 1 to 17

In the formula (I) each X, which may be the same or different, is a sigma ligand, preferably a hydrogen atom, a halogen atom, a $R^3$, $OR^3$, $OSO_2CF_3$, $OCOR^3$, $SR^3$, $NR^3_2$ or $PR^3_2$ group wherein $R^3$ is a linear or branched, cyclic or acyclic, $C_1$-$C_{20}$-alkyl, $C_2$-$C_{20}$-alkenyl, $C_2$-$C_{20}$-alkynyl, $C_6$-$C_{20}$-aryl, $C_7$-$C_{20}$-alkylaryl or $C_7$-$C_{20}$-arylalkyl radical; optionally containing heteroatoms belonging to groups 14-16 or is $SiR^3_3$, $SiHR^3_2$ or $SiH_2R^3$. $R^3$ is preferably $C_{1-6}$-alkyl, phenyl or benzyl group.

The term halogen includes fluoro, chloro, bromo and iodo groups, preferably chloro groups.

More preferably each X is independently a halogen atom or a $R^3$ or $OR^3$ group, whereby $R^3$ is a $C_{1-6}$-alkyl, phenyl or benzyl group.

Most preferably X is methyl, benzyl or chlorine group. Preferably both X groups are the same. M is preferably Hf.

R are the same or different from each other and can be saturated linear or branched $C_1$-$C_{10}$ alkyl, $C_5$-$C_{10}$ aryl, $C_6$-$C_{20}$ alkylaryl or $C_6$-$C_{20}$ arylalkyl groups, which can optionally contain up to 2 heteroatoms or silicon atoms.

Preferably R are the same or different from each other and can be saturated linear or branched $C_1$-$C_6$ alkyl, $C_6$-$C_{10}$ aryl, $C_6$-$C_{20}$ alkylaryl or $C_3$-$C_{20}$ arylalkyl groups, which do not contain heteroatoms or silicon atoms.

More preferably all R are the same and are saturated linear or branched $C_1$-$C_6$ alkyl or $C_6$-$C_{10}$ aryl, and even more preferred all R are the same and are a saturated linear or branched $C_1$-$C_6$ alkyl.

Most preferably all R are the same and are all $C_1$ alkyl groups.

$R^1$ is a $C_6$-$C_{10}$ aryl or $C_6$-$C_{20}$ alkylaryl group optionally containing up to 2 heteroatoms or silicon atoms or a $C_4$-$C_{10}$ heteroaryl group. $C_6$-$C_{20}$ alkylaryl group is meant to be an $C_6$-$C_{10}$ aryl group which is substituted by one or more alkyl groups which may be the same or different, whereby the number of C-atoms in the alkyl group substituents is in a range which leads to $C_6$-$C_{20}$ alkylaryl groups.

Non limiting examples for $R^1$ are phenyl, para-tolyl, para-iso-propylphenyl, 3,5-dimethylphenyl, beta-naphthyl, 4-(N,N-dimethylamino)phenyl, 4-pyridyl, beta-thiophenyl, 4-methyl-thiophenyl etc.

Preferably $R^1$ is a $C_6$-$C_{10}$ aryl or $C_6$-$C_{12}$ alkylaryl group, which do not contain heteroatoms or silicon atoms or a $C_4$-$C_8$ heteroaryl group.

More preferably $R^1$ is unsubstituted phenyl (i.e. $C_6$ aryl), or phenyl substituted by one to two $C_1$-$C_6$ alkyl groups (i.e. $C_7$-$C_{18}$ alkylaryl group).

Even more preferably $R^1$ is phenyl, para-tolyl or para-iso-propylphenyl. Most preferably $R^1$ is phenyl or para-iso-propylphenyl $R^2$ is a $C_4$-$C_{20}$ cycloalkyl group, optionally carrying alkyl substituents in beta-positions, of formula (II)

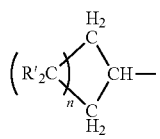
(II)

in which R' can be the same or can be different from each other and can be hydrogen or is defined as R and n is 1 to 17.

Preferably $R^2$ is a $C_4$-$C_{10}$ cycloalkyl group of formula (II), wherein n is 1 to 7 and R' can be the same or can be different from each other and can be hydrogen or saturated linear or branched $C_1$-$C_6$ alkyl or $C_6$-$C_{10}$ aryl.

More preferably $R^2$ is a $C_4$-$C_{10}$ cycloalkyl group of formula (II), wherein n is 1 to 7 and R' can be the same or can be different from each other and can be hydrogen or saturated linear or branched $C_1$-$C_4$ alkyl group.

Non-limiting examples for $R^2$ are cyclobutyl, 3,3-dimethylcyclobutyl, cyclopentyl, cyclohexyl, 3,3,5,5-tetramethylcyclohexyl and the like.

Most preferably $R^2$ is a $C_4$-$C_8$ cycloalkyl group of formula (II), wherein n is 1 to 5 and all R' are hydrogen.

Non-limiting examples of complexes of formula (I) are
1. (Phenyl)(cyclohexyl)methylene(cyclopentadienyl)(2,7-di-tert-butylfluoren-9-yl)hafnium dichloride
2. (Phenyl)(cyclohexyl)methylene(cyclopentadienyl)(2,7-di-tert-butylfluoren-9-yl)hafnium dimethyl
3. (Phenyl)(cyclohexyl)methylene(cyclopentadienyl)(2,7-di-tert-butylfluoren-9-yl)hafnium dibenzyl
4. (Phenyl)(cyclopentyl)methylene(cyclopentadienyl)(2,7-di-tert-butylfluoren-9-yl)hafnium dichloride
5. (Phenyl)(cyclopentyl)methylene(cyclopentadienyl)(2,7-di-tert-butylfluoren-9-yl)hafnium dimethyl
6. (Phenyl)(cyclopentyl)methylene(cyclopentadienyl)(2,7-di-tert-butylfluoren-9-yl)hafnium dibenzyl
7. (Phenyl)(cyclobutyl)methylene(cyclopentadienyl)(2,7-di-tert-butylfluoren-9-yl)hafnium dichloride
8. (Phenyl)(cyclobutyl)methylene(cyclopentadienyl)(2,7-di-tert-butylfluoren-9-yl)hafnium dimethyl
9. (4-isopropylphenyl)(cyclohexyl)methylene(cyclopentadienyl)(2,7-di-tert-butylfluoren-9-yl)hafnium dichloride
10. (4-isopropylphenyl)(cyclohexyl)methylene(cyclopentadienyl)(2,7-di-tert-butylfluoren-9-yl)hafnium dimethyl
11. (4-isopropylphenyl)(cyclopentyl)methylene(cyclopentadienyl)(2,7-di-tert-butylfluoren-9-yl)hafnium dichloride
12. (4-isopropylphenyl)(cyclopentyl)methylene(cyclopentadienyl)(2,7-di-tert-butylfluoren-9-yl)hafnium dimethyl
13. (4-isopropylphenyl)(cyclobutyl)methylene(cyclopentadienyl)(2,7-di-tert-butylfluoren-9-yl)hafnium dichloride
14. (4-isopropylphenyl)(cyclobutyl)methylene(cyclopentadienyl)(2,7-di-tert-butylfluoren-9-yl)hafnium dimethyl
15. (3,5-di-isopropylphenyl)(cyclohexyl)methylene(cyclopentadienyl)(2,7-di-tert-butylfluoren-9-yl)hafnium dichloride
16. (3,5-di-isopropylphenyl)(cyclohexyl)methylene(cyclopentadienyl)(2,7-di-tert-butylfluoren-9-yl)hafnium dimethyl
17. (3,5-di-isopropylphenyl)(cyclopentyl)methylene(cyclopentadienyl)(2,7-di-tert-butylfluoren-9-yl)hafnium dichloride
18. (3,5-di-isopropylphenyl)(cyclopentyl)methylene(cyclopentadienyl)(2,7-di-tert-butylfluoren-9-yl)hafnium dimethyl
19. (3,5-di-isopropylphenyl)(cyclobutyl)methylene(cyclopentadienyl)(2,7-di-tert-butylfluoren-9-yl)hafnium dichloride
20. (3,5-di-isopropylphenyl)(cyclobutyl)methylene(cyclopentadienyl)(2,7-di-tert-butylfluoren-9-yl)hafnium dimethyl Further preferred examples are the complexes above having dibenzyl as X substituents instead of dimethl or dichloride Even more preferred are dimethyl and dibenzyl complexes.

Cocatalyst

To form an active catalytic species it is normally necessary to employ a cocatalyst as is well known in the art. The present invention requires the use of a boron containing cocatalyst.

Boron based cocatalysts of interest include boron compounds containing a borate $3^+$ ion, i.e. borate compounds. These compounds generally contain an anion of formula:

$$(Z)_4 B^- \quad (III)$$

where Z is an optionally substituted phenyl derivative, said substituent being a halo$C_{1-6}$-alkyl or halo group. Preferred options are fluoro or trifluoromethyl. Most preferably, the phenyl group is perfluorinated.

Such ionic cocatalysts preferably contain a non-coordinating anion such as tetrakis(pentafluorophenyl)borate.

Suitable counterions are protonated amine or aniline derivatives or phosphonium ions. These may have the general formula (IV) or (V):

$NQ_4^+$ (IV) or $PQ_4^+$ (V)

where Q is independently H, $C_{1-6}$-alkyl, $C_{3-8}$ cycloalkyl, phenyl$C_{1-6}$-alkylene- or optionally substituted Ph. Optional substituents may be C1-6-alkyl, halo or nitro. There may be one or more than one such substituent. Preferred substituted Ph groups include therefore para-substituted phenyl, preferably tolyl or dimethylphenyl.

It is preferred if at least one Q group is H, thus preferred compounds are those of formula:

$NHQ_3^+$ (VI) or $PHQ_3^+$ (VII)

Preferred phenyl$C_{1-6}$-alkyl-groups include benzyl.

Suitable counterions therefore include: methylammonium, anilinium, dimethylammonium, diethylammonium, N-methylanilinium, diphenylammonium, N,N-dimethylanilinium, trimethylammonium, triethylammonium, tri-n-butylammonium, methyldiphenylammonium, p-bromo-N,N-dimethylanilinium or p-nitro-N,N-dimethylanilinium, especially dimethylammonium or N,N-dimethylanilinium. The use of pyridinium as an ion is a further option.

Phosphonium ions of interest include triphenylphosphonium, triethylphosphonium, diphenylphosphonium, tri(methylphenyl)phosphonium and tri(dimethylphenyl)phosphonium. A more preferred counterion is trityl $(CPh_3^+)$ or analogues thereof in which the Ph group is functionalised to carry one or more alkyl groups. Highly preferred borates of use in the invention therefore comprise the tetrakis(pentafluorophenyl)borate ion.

Preferred ionic compounds which can be used according to the present invention include: tributylammoniumtetra(pentafluorophenyl)borate, tributylammoniumtetra(trifluoromethylphenyl)borate, tributylammoniumtetra-(4-fluorophenyl)borate, N,N-dimethylcyclohexylammoniumtetrakis-(pentafluorophenyl)borate, N,N-dimethylbenzylammoniumtetrakis(pentafluorophenyl)borate, N,N-dimethylaniliniumtetrakis(pentafluorophenyl)borate, N,N-di(propyl)ammoniumtetrakis(pentafluorophenyl)borate, di(cyclohexyl)ammoniumtetrakis(pentafluorophenyl)borate, triphenylcarbeniumtetrakis(pentafluorophenyl)borate, ferroceniumtetrakis(pentafluorophenyl)borate.

Preference is given to triphenyicarbeniumtetrakis(pentafluorophenyl) borate, N,N-dimethylcyclohexylammoniumtetrakis(pentafluorophenyl)borate, N,N-dimethylbenzylammoniumtetrakis(pentafluorophenyl)borate or N,N-dimethylaniliniumtetrakis(pentafluorophenyl)borate.

More preferred borates are triphenylcarbeniumtetrakis(pentafluorophenyl) borate and N,N-dimethylaniliniumtetrakis(pentafluorophenyl) borate. N,N-dimethylaniliniumtetrakis(pentafluorophenyl)borate is most preferred.

It is further possible to add an aluminium alkyl compound. Suitable aluminium alkyl compounds are compounds of the formula (VIII) $AlR_3$ with R being a linear or branched $C_2$-$C_8$-alkyl group. Preferred aluminium alkyl compounds are triethylaluminium, tri-isobutylaluminium, tri-isohexylaluminium, tri-n-octylaluminium and tri-isooctylaluminium.

Suitable amounts of cocatalyst will be well known to the skilled man.

The molar ratio of boron to the metal ion of the metallocene may be in the range 0.5:1 to 10:1 mol/mol, preferably 1:1 to 10:1, especially 1:1 to 5:1 mol/mol.

Even more preferred is a molar ratio of boron to the metal ion of the metallocene from 1:1 to less than 2:1 mol/mol, e.g. from 1:1 to 1.8:1 or 1:1 to 1.5:1.

Catalyst Manufacture

The metallocene complex of the present invention is used in combination with the cocatalyst(s) as a catalyst system for the polymerization of ethylene and $C_{4-10}$ alpha-olefin comonomer in a high temperature solution polymerization process.

The catalyst system of the invention may be used as a homogeneous catalyst or heterogeneous catalyst, preferably as homogeneous catalyst system.

Homogeneous or non-supported catalyst systems, suitable for the present invention can be prepared in solution, for example in an hydrocarbon solvent like hexane, cyclohexane, heptane, light naphta or toluene, by contacting the metallocene (as a solid or as a solution) with the cocatalyst(s), for example a borane or a borate salt as slurry in a hydrocarbon diluent or previously dissolved in an aromatic solvent, or preferably can be formed by sequentially adding the catalyst components directly into the polymerization reactor.

Polymer

The polymer to be produced using the catalyst system of the invention is copolymer of ethylene and a C4-10 alpha-olefin comonomer, like 1-butene, 1-hexene, 4-methyl-1-pentene, 1-octene etc. Preferably butene, hexene or octene and more preferably octene is used as comonomer.

The comonomer content in such a polymer may be up to 45 mol %, preferably between 1 to 40 mol %, more preferably 1.5 to 35 mol % and even more preferably 2 to 25 mol %. The density (measured according to ISO 1183-187) of the polymers is in the range of 0.850 g/cm$^3$ to 0.930 g/cm$^3$, preferably in the range of 0.850 g/cm$^3$ to 0.920 g/cm$^3$ and more preferably in the range of 0.850 g/cm$^3$ to 0.910 g/cm$^3$.

Mw/Mn value of the polymers of the invention is less than 5, e.g. in the range of 2.0 to 4.5.

The melting points (measured with DSC according to ISO 11357-3:1999) of the polymers to be produced are below 130° C., preferably below 120° C., more preferably below 110° C. and most preferably below 100° C.

Polymerization

The catalyst system of the present invention is used to produce the above defined ethylene copolymers in a high temperature solution polymerization process at temperatures higher than 100° C. In view of this invention such process is essentially based on polymerizing the monomer and a suitable comonomer in a liquid hydrocarbon solvent in which the resulting polymer is soluble.

The polymerization is carried out at a temperature above the melting point of the polymer, as a result of which a polymer solution is obtained. This solution is flashed in order to separate the polymer from the unreacted monomer and the solvent. The solvent is then recovered and recycled in the process.

A solution polymerization process is known for its short reactor residence times (compared to Gas-phase or slurry processes) allowing, thus, very fast grade transitions and significant flexibility in producing a wide product range in a short production cycle.

According to the present invention the used solution polymerization process is a high temperature solution polymerization process, using a polymerization temperature of higher than 100° C. Preferably the polymerization temperature is at least 110° C., more preferably at least 150° C. The polymerization temperature can be up to 250° C. The pressure in the used solution polymerization process according to the invention is preferably in a range of 10 to 100 bar, preferably 15 to 100 bar and more preferably 20 to 100 bar.

The liquid hydrocarbon solvent used is preferably a $C_{5-12}$-hydrocarbon which may be unsubstituted or substituted by $C_{1-4}$ alkyl group such as pentane, methyl pentane, hexane, heptane, octane, cyclohexane, methylcyclohexane and hydrogenated naphtha. More preferably unsubstituted $C_{6-10}$-hydrocarbon solvents are used.

Advantage

The new catalyst systems, comprising component (i) and (ii) can be advantageously used for ethylene copolymerization in high temperature solution polymerization process.

The catalyst systems according to the present invention show high productivity combined with high solubility, molecular weight capability and comonomer incorporation ability, if used for ethylene copolymerization in high temperature solution polymerization process.

Applications

The polymers made by the catalyst system of the invention are useful in all kinds of end articles such as pipes, films (cast or blown films), fibers, moulded articles (e.g. injection moulded, blow moulded, rotomoulded articles), extrusion coatings and so on.

The invention will now be illustrated by reference to the following non-limiting examples

EXAMPLES

Methods

DSC

Temperature modulated DSC experiments were performed in a TA Instruments Q2000 DSC operated in modulated mode and calibrated with indium, tin and zinc according to ISO 11357-1. Circa 5 mg of the sample were placed in an aluminium pan. The temperature was initially raised to 180° C. and afterwards lowered to −88° C. at 10° C./min as in standard DSC. Afterwards the temperature was raised by a temperature modulated scan with heating rate of 2° C./min modulated of 0.32° C. every 60 seconds. The glass transition temperature was measured from the reversible heat flow thermogram as the inversion point at transition.

If the polymer composition has been estimated by Tg(DSC) the following internal correlation has been used:
C8(wt %)=(Tg(° C.)+19.16)/−1.059

Zr and Hf Determination (ICP-Method)

The elementary analysis of a catalyst was performed by taking a solid sample of mass, M, cooling over dry ice. Samples were diluted up to a known volume, V, by dissolving in nitric acid ($HNO_3$, 65%, 5% of V) and freshly deionised (DI) water (5% of V). The solution was then added to hydrofluoric acid (HF, 40%, 3% of V), diluted with DI water up to the final volume, V, and left to stabilise for two hours.

The analysis was run at room temperature using a Thermo Elemental iCAP 6300 Inductively Coupled Plasma-Optical Emission Spectrometer (ICP-OES) which was calibrated using a blank (a solution of 5% $HNO_3$, 3% HF in DI water), and 6 standards of 0.5 ppm, 1 ppm, 10 ppm, 50 ppm, 100 ppm and 300 ppm of Al, with 0.5 ppm, 1 ppm, 5 ppm, 20 ppm, 50 ppm and 100 ppm of Hf and Zr in solutions of 5% $HNO_3$, 3% HF in DI water.

Immediately before analysis the calibration is 'resloped' using the blank and 100 ppm Al, 50 ppm Hf, Zr standard, a quality control sample (20 ppm Al, 5 ppm Hf, Zr in a solution of 5% $HNO_3$, 3% HF in DI water) is run to confirm the reslope. The QC sample is also run after every 5th sample and at the end of a scheduled analysis set.

The content of hafnium was monitored using the 282.022 nm and 339.980 nm lines and the content for zirconium using 339.198 nm line. The content of aluminium was monitored via the 167.079 nm line, when Al concentration in ICP sample was between 0-10 ppm (calibrated only to 100 ppm) and via the 396.152 nm line for Al concentrations above 10 ppm.

The reported values are an average of three successive aliquots taken from the same sample and are related back to the original catalyst by inputting the original mass of sample and the dilution volume into the software.

Quantification of Comonomer Content by NMR Spectroscopy

Quantitative nuclear-magnetic resonance (NMR) spectroscopy was used to quantify the comonomer content of the polymers.

Quantitative $^{13}C\{^1H\}$ NMR spectra recorded in the molten-state using a Bruker Advance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probe-head at 150° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification.[1],[2],[3],[4] Standard single-pulse excitation was employed utilising the transient NOE at short recycle delays of 3 s[5],[1] and the RS-HEPT decoupling scheme.[6],[7] A total of 1024 (1 k) transients were acquired per spectrum. This setup was chosen due to its high sensitivity towards low comonomer contents.

Quantitative $^{13}C\{^1H\}$ NMR spectra were processed, integrated and quantitative properties determined using custom spectral analysis automation programs. All chemical shifts are internally referenced to the bulk methylene signal (δ+) at 30.00 ppm.[8]

Characteristic signals corresponding to the incorporation of 1-octene were observed.[8],[9],[10],[11],[12] and all comonomer contents calculated with respect to all other monomers present in the polymer.

Characteristic signals resulting from isolated 1-octene incorporation i.e. EEOEE comonomer sequences, were observed. Isolated 1-octene incorporation was quantified using the integral of the signal at 38.32 ppm. This integral is assigned to the unresolved signals corresponding to both $*B6$ and $*\beta B6B6$ sites of isolated (EEOEE) and isolated double non-consecutive (EEOEOEE) 1-octene sequences respectively. To compensate for the influence of the two $*\beta B6B6$ sites the integral of the $\beta\beta B6B6$ site at 24.7 ppm is used:

$$O=I_{*B6+*\beta B6B6}-2*I_{\beta\beta B6B6}$$

Characteristic signals resulting from consecutive 1-octene incorporation, i.e. EEOOEE comonomer sequences, were also observed. Such consecutive 1-octene incorporation was quantified using the integral of the signal at 40.48 ppm assigned to the $\alpha\alpha B6B6$ sites accounting for the number of reporting sites per comonomer:

$$OO=2*I_{\alpha\alpha B6B6}.$$

Characteristic signals resulting from isolated non-consecutive 1-octene incorporation, i.e. EEOEOEE comonomer sequences, were also observed. Such isolated non-consecutive 1-octene incorporation was quantified using the integral of the signal at 24.7 ppm assigned to the ββB6B6 sites accounting for the number of reporting sites per comonomer:

$$OEO = 2 * I_{\beta\beta B6B6}$$

Characteristic signals resulting from isolated triple-consecutive 1-octene incorporation, i.e. EEOOOEE comonomer sequences, were also observed. Such isolated triple-consecutive 1-octene incorporation was quantified using the integral of the signal at 41.2 ppm assigned to the ααγB6B6B6 sites accounting for the number of reporting sites per comonomer:

$$OOO = 3/2 * I_{\alpha\alpha\gamma B6B6B6}$$

With no other signals indicative of other comonomer sequences observed the total 1-octene comonomer content was calculated based solely on the amount of isolated (EEOEE), isolated double-consecutive (EEOOEE), isolated non-consecutive (EEOEOEE) and isolated triple-consecutive (EEOOOEE) 1-octene comonomer sequences:

$$O_{total} = O + OO + OEO + OOO$$

Characteristic signals resulting from saturated end-groups were observed. Such saturated end-groups were quantified using the average integral of the two resolved signals at 22.84 and 32.23 ppm. The 22.84 ppm integral is assigned to the unresolved signals corresponding to both 2B6 and 2S sites of 1-octene and the saturated chain end respectively. The 32.23 ppm integral is assigned to the unresolved signals corresponding to both 3B6 and 3S sites of 1-octene and the saturated chain end respectively. To compensate for the influence of the 2B6 and 3B6 1-octene sites the total 1-octene content is used:

$$S = (½) * (I_{2S+2B6} + I_{3S+3B6} - 2 * O_{total})$$

The ethylene comonomer content was quantified using the integral of the bulk methylene (bulk) signals at 30.00 ppm. This integral included the γ and 4B6 sites from 1-octene as well as the δ$^+$ sites. The total ethylene comonomer content was calculated based on the bulk integral and compensating for the observed 1-octene sequences and end-groups:

$$E_{total} = (½) * [I_{bulk} + 2*O + 1*OO + 3*OEO + 0*OOO + 3*S]$$

It should be noted that compensation of the bulk integral for the presence of isolated triple-incorporation (EE-OOOEE) 1-octene sequences is not required as the number of under and over accounted ethylene units is equal.

The total mole fraction of 1-octene in the polymer was then calculated as:

$$fO = (O_{total}/(E_{total} + O_{total}))$$

The total comonomer incorporation of 1-octene in weight percent was calculated from the mole fraction in the standard manner:

$$O[wt \%] = 100 * (fO * 112.21)/((fO * 112.21) + ((1-fO) * 28.05))$$

[1] Klimke, K., Parkinson, M., Piel, C., Kaminsky, W., Spiess, H. W., Wilhelm, M., Macromol. Chem. Phys. 2006; 207:382.

[2] Parkinson, M., Klimke, K., Spiess, H. W., Wilhelm, M., Macromol. Chem. Phys. 2007; 208:2128.

[3] Castignolles, P., Graf, R., Parkinson, M., Wilhelm, M., Gaborieau, M., Polymer 50 (2009) 2373

[4] NMR Spectroscopy of Polymers: Innovative Strategies for Complex Macromolecules, Chapter 24, 401 (2011)

[5] Pollard, M., Klimke, K., Graf, R., Spiess, H. W., Wilhelm, M., Sperber, O., Piel, C., Kaminsky, W., Macromolecules 2004; 37:813.

[6] Filip, X., Tripon, C., Filip, C., J. Mag. Resn. 2005, 176, 239

[7] Griffin, J. M., Tripon, C., Samoson, A., Filip, C., and Brown, S. P., Mag. Res. in Chem. 2007 45, S1.S198

[8] J. Randall, Macromol. Sci., Rev. Macromol. Chem. Phys. 1989, C29, 201.

[9] Liu, W., Rinaldi, P., McIntosh, L., Quirk, P., Macromolecules 2001, 34, 4757

[10] Qiu, X., Redwine, D., Gobbi, G., Nuamthanom, A., Rinaldi, P., Macromolecules 2007, 40, 6879

[11] Busico, V., Carbonniere, P., Cipullo, R., Pellecchia, R., Severn, J., Talarico, G., Macromol. Rapid Commun. 2007, 28, 1128

[12] Zhou, Z., Kuemmerle, R., Qiu, X., Redwine, D., Cong, R., Taha, A., Baugh, D. Winniford, B., J. Mag. Reson. 187 (2007) 225

GPC: Molecular weight averages, molecular weight distribution, and polydispersity index ($M_n$, $M_w$, $M_w/M_n$)

Molecular weight averages (Mw, Mn), Molecular weight distribution (MWD) and its broadness, described by polydispersity index, PDI=Mw/Mn (wherein Mn is the number average molecular weight and Mw is the weight average molecular weight) of the polymer were determined by high temperature size exclusion chromatography (HT-SEC) on a Polymer Laboratories PLXT-20 Rapid GPC Polymer Analysis System (including pump, refractive index detector and viscosity detector) at 160° C. with 3 PLgel Olexis (300×7.5 mm, Polymer Laboratories) columns in series. 1,2,4-Trichlorobenzene containing butylated hydroxytoluene (0.5 g/L) and Irganox 1010 (20 mg/L) was used as eluent at a flow rate of 1.0 mL/min. The molecular weights were calculated with respect to polyethylene standards (Polymer Laboratories, Mp=5.310 up to Mp=1.510.000 g/mol). A Polymer Laboratories PL XT-220 robotic sample handling system was used as autosampler. The concentration of the samples was between 2 and 4 mg polymer/mL of TCB.

Determination of the Relative Comonomer Reactivity Ratio R

Ethylene concentration in liquid phase can be considered constant since total pressure is kept constant by feeding ethylene during polymerization. The $C_8/C_2$ ratio in solution at the end of the polymerization is calculated by subtracting the amount of octene incorporated in the polymer from the measured composition of the latter (% wt 1-octene)

The reactivity ratio, R, for each catalyst is then calculated as:

$$R = [(C_8/C_2)_{pol}]/[(C_8/C_2)_{average\ in\ liquid\ phase}]$$

Where $(C_8/C_2)$ average in liquid phase is Calculated as $((C_8/C_2)_{final} + (C_8/C_{12})_{feed})/2$ Solubility of the Hafnium Complex in Hexane Procedure for the solubility test:

All experiments were carried out under inert atmosphere in a septum bottle.

1. Inside the glovebox, 10.5 mg of complex was weighted in a septum bottle.
2. 1 g of hexane was added to the solid complex
3. After stirring for 20 h at room temperature, solution is checked
4. if no insoluble material is observed, repeat steps 1 and 3 until you reach saturation and insoluble materials are observed.

Chemicals

N,N-Dimethylanilinium Tetrakis(pentafluorophenyl)borate (AB) (CAS 118612-00-3) was purchased from Boulder.

1-octene as co-monomer (99%, Sigma Aldrich) was dried over molecular sieves and degassed with nitrogen before use.

Heptane and decane (99.9%, Sigma Aldrich) were dried over molecular sieves and degassed with nitrogen before use.

CATALYST PREPARATION EXAMPLES a) Complex Preparation:
Inventive Complex (IC):

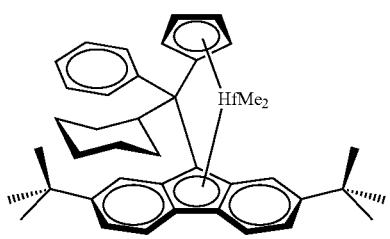

(Phenyl)(cyclohexyl)methylene(cyclopentadienyl)(2,7-di-tert-butylfluoren-9-yl)hafnium dimethyl Step 1: 6-Phenyl-6-cyclohexylfulvene

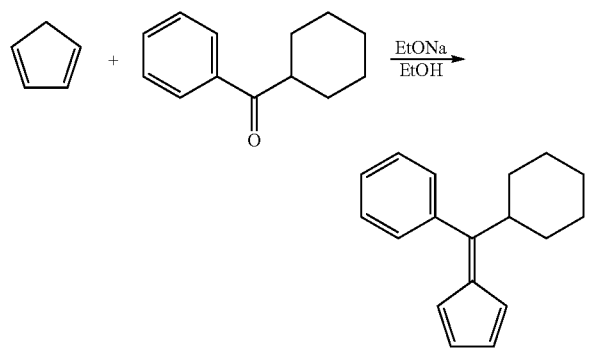

To a solution of sodium ethoxide obtained from 6.11 g (267.7 mmol) of sodium metal and 160 ml of dry ethanol 22.0 g (332.8 mmol) of cyclopentadiene was added dropwise over 10 min and the resulting red solution was stirred 0.5 h at room temperature. Then, 25.0 g (132.8 mmol) of phenyl cyclohexyl ketone was added and the resulting dark-red mixture was stirred 22 h at room temperature. Then, it was poured into 1000 ml of water. After acidification with 2 M HCl to pH ca. 6.5, the product was extracted with 500 ml of dichloromethane. The organic layer was separated, dried over $Na_2SO_4$ and concentrated under a reduced pressure. The product was isolated by flash-chromatography on silica gel 60 (40-63 urn, 800 ml; eluent: hexane). This procedure gave 22.09 g (70%) of 6-phenyl-6-cyclohexylfulvene as a light-red oil which completely solidified upon storage at −30° C.

Anal. calc. for $C_{18}H_{20}$: C, 91.47; H, 8.53. Found: Cl, 91.79; H, 8.72.

$^1$H NMR (CDCl$_3$): δ 7.35-7.29 (m, 3H), 7.19-7.14 (m, 2H), 6.71 (dt, J=5.4 Hz, J=1.6 Hz, 1H), 6.54 (dt, J=5.4 Hz, J=1.6 Hz, 1H), 6.36 (dt, J=5.3 Hz, J=1.5 Hz, 1H), 5.74 (dt, J=5.3 Hz, J=1.7 Hz, 1H), 3.10 (tt, J=11.8 Hz, J=3.2 Hz, 1H), 1.85-1.73 (m, 4H), 1.66 (dm, J=13.2 Hz, 1H), 1.37 (qt, J=12.9 Hz, 3.2 Hz, 2H), 1.30 (qd, J=12.4 Hz, 3.2 Hz, 2H), 1.06 (qt, J=12.9 Hz, 3.7 Hz, 1H).

Step 2: Phenyl-cyclohexyl-cyclopentadienyl-(2,7-di-tert-butylfluoren-9-yl)methane

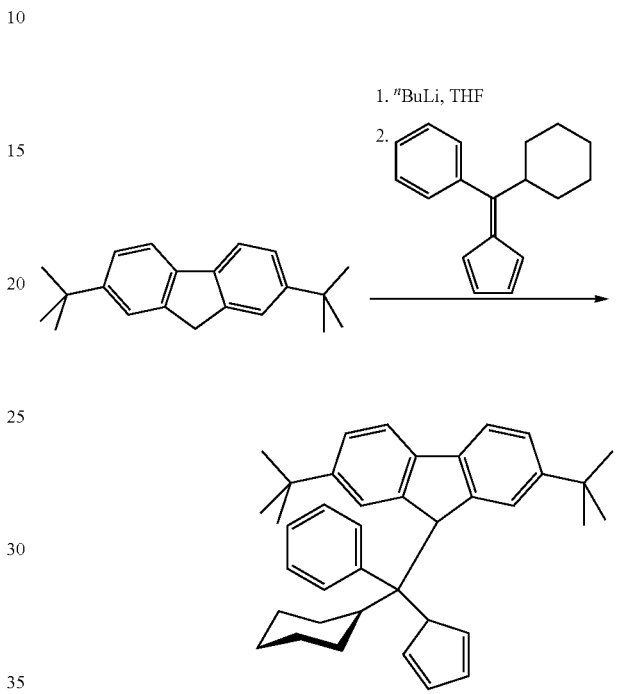

To a solution of 26.0 g (93.38 mmol) of 2,7-di-tert-butylfluorene in 250 ml of THF cooled to −50° C. 38.4 ml (93.31 mmol) of 2.43 M $^n$BuLi in hexanes was added in one portion. This mixture was stirred overnight at room temperature. To the resulting orange solution a solution of 22.09 g (93.46 mmol) of 6-phenyl-6-cyclohexylfulvene in 200 ml of THF was added at room temperature in one portion. After stirring overnight at room temperature the dark-red reaction mixture was cooled in an ice-bath and then quenched with a solution of 8.8 ml of 12 M HCl in 100 ml of water. The resulting orange mixture was diluted with 1000 ml of water and then extracted with 500 ml of ether. The organic layer was separated and dried over $Na_2SO_4$. Removal of the solvents under vacuum gave orange oil, which was dissolved in 250 ml of n-hexane, and the resulting solution was slowly evaporated in vacuo to volume ca. 50 ml. The obtained suspension was diluted with 200 ml of n-hexane and filtered off (G3) to give 33.17 g (69%) of 1-phenyl-1-cyclohexyl-1-cyclopentadienyl-1-(2,7-di-tert-butylfluorenyl)methane as a white powder.

Anal. calc. for $C_{39}H_{46}$: Cl, 90.99; H, 9.01. Found: Cl, 91.34; H, 9.38.

$^1$H NMR (CDCl$_3$): δ 8.18-6.16 (set of multiplets, sum 12H), 6.02-4.86 (set of singlets, sum 3H), 3.57-0.13 (set of singlets and multiplets, sum 31H).

Step 3: (Phenyl)(cyclohexyl)methylene(cyclopentadienyl)(2,7-di-tert-butylfluoren-9-yl)hafnium dichloride

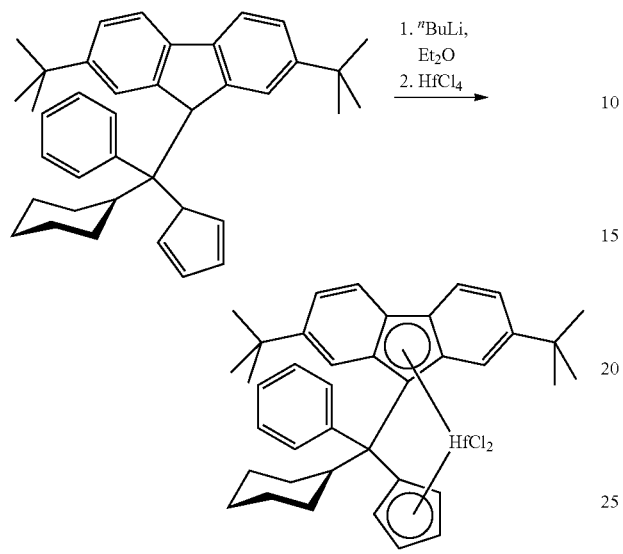

Step 4: (Phenyl)(cyclohexyl)methylene(cyclopentadienyl)(2,7-di-tert-butylfluoren-9-yl)hafnium dimethyl

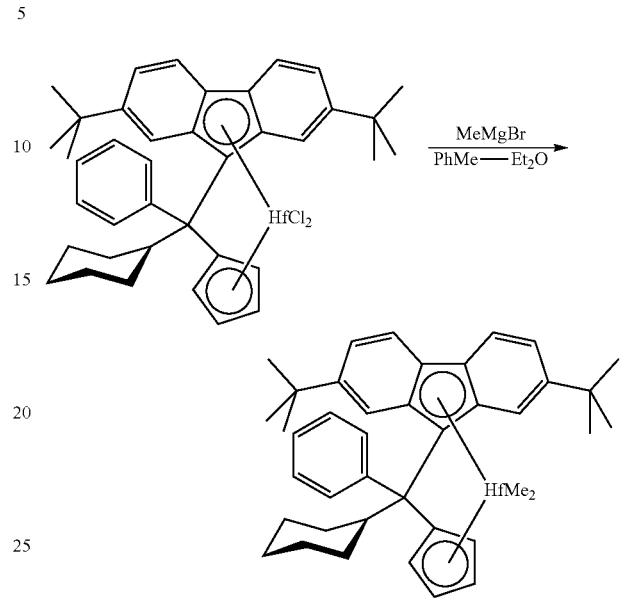

To a solution of 10.17 g (19.76 mmol) of 1-phenyl-1-cyclohexyl-1-cyclopentadienyl-1-(2,7-di-tert-butylfluoren-9-yl)methane in 250 ml of ether cooled to −78° C. 15.8 ml (39.5 mmol) of 2.5 M $^n$BuLi in hexanes was added in one portion. This mixture was stirred overnight at room temperature. The resulting light-orange solution with orange precipitate was cooled to −50° C., and 6.33 g (19.76 mmol) of HfCl$_4$ was added. The formed mixture was stirred for 24 h at room temperature and then evaporated to dryness. The residue was stirred with 100 ml of warm toluene, the formed suspension was filtered through a glass frit (G4), and the filtrate was evaporated to ca. 35 ml. Precipitated overnight at room temperature white solid was filtered off (G4) and discarded. The mother liquor was evaporated to ca. 20 ml, and 20 ml of n-hexane was added to the residue. Yellow solid precipitated overnight at −30° C. was filtered off (G3) and dried in vacuo to give 3.20 g of (phenyl)(cyclohexyl)methylene (cyclopentadienyl)(2,7-di-tert-butylfluoren-9-yl) hafnium dichloride. The mother liquor was evaporated to dryness, and the residue was dissolved in 25 ml of n-hexane. Solid precipitated from this solution overnight at −30° C. was collected and dried in vacuo. This procedure gave additional 0.60 g of the target complex. Thus, the total yield of (phenyl)(cyclohexyl)methylene(cyclopentadienyl)(2,7-di-tert-butylfluoren-9-yl) hafnium dichloride isolated in this synthesis was 3.80 g (25%).

Anal. calc. for C$_{39}$H$_{44}$Cl$_2$Hf: Cl, 61.46; H, 5.82. Found: Cl, 61.37; H, 6.10.

$^1$H NMR (CDCl$_3$): δ 8.02 (d, J=8.8 Hz, 1H), 7.95 (d, J=8.8 Hz, 1H), 7.76 (d, J=7.8 Hz, 1H), 7.68 (s, 1H), 7.63 (dd, J=8.8 Hz, J=1.2 Hz, 1H), 7.57-7.51 (m, 2H), 7.48 (dd, J=8.8 Hz, J=1.6 Hz, 1H), 7.45-7.41 (m, 1H), 7.39 (ddd, J=7.5 Hz, J=7.5 Hz, J=1.0 Hz, 1H), 6.56-6.31 (m, 1H), 6.21-6.16 (m, 1H), 5.96 (s, 1H), 5.76-5.71 (m, 1H), 5.55-5.50 (m, 1H), 3.26 (t, J=11.5 Hz, 1H), 2.33 (d, J=12.9 Hz, 1H), 2.14 (d, J=12.3 Hz, 1H), 1.94-1.83 (m, 2H), 1.16 (d, J=13.2 Hz, 1H), 1.66-1.56 (m, 1H), 1.53-1.40 (m, 1H), 1.41 (s, 9H), 1.40-1.30 (m, 1H), 1.12-1.01 (m, 1H), 0.96 (s, 9H), 0.91-0.79 (m, 1H).

To a solution of 3.80 g (4.99 mmol) of (phenyl)(cyclohexyl)methylene(cyclopentadienyl)(2,7-di-tert-butylfluoren-9-yl)hafnium dichloride in a mixture of 50 ml of toluene and 50 ml of ether 7.0 ml (14.77 mmol) of 2.11 M MeMgBr in ether was added. The resulting mixture was refluxed for 30 min and then evaporated to ca. 25 ml. The obtained mixture was heated to 80-90° C. and filtered while hot through glass frit (G4) to remove insoluble magnesium salts. The filter cake was additionally washed with 5×20 ml of warm n-hexane. The combined filtrate was evaporated almost to dryness, and then 20 ml of n-hexane was added to the residue. The resulting mixture was filtered once again through a glass frit (G4). The mother liquor was evaporated to dryness, and the residue was dissolved in 7 ml of n-hexane. Yellow powder precipitated from this solution overnight at −30° C. was collected and dried in vacuum.

This procedure gave 3.05 g (88%) of pure (phenyl)(cyclohexyl)methylene(cyclopentadienyl) (2,7-di-tert-butylfluoren-9-yl)hafnium dimethyl.

Anal. calc. for C$_{41}$H$_{50}$Hf: Cl, 68.27; H, 6.99. Found: Cl, 68.49; H, 7.22.

$^1$H NMR (CDCl$_3$): δ 8.08 (d, J=8.6 Hz, 1H), 7.98 (d, J=8.9 Hz, 1H), 7.73 (d, J=7.6 Hz, 1H), 7.58-7.48 (m, 3H), 7.45 (td, J=7.6 Hz, J=1.5 Hz, 1H), 7.38-7.28 (m, 3H), 6.28-6.21 (m, 1H), 6.12-6.06 (m, 1H), 5.86 (s, 1H), 5.62-5.55 (m, 1H), 5.33-5.27 (m, 1H), 3.06 (t, J=11.5 Hz, 1H), 2.28 (d, J=12.8 Hz, 1H), 2.10 (d, J=12.3 Hz, 1H), 1.90-1.75 (m, 2H), 1.70 (d, J=1.3.3 Hz, 1H), 1.65-1.20 (m, 1H), 1.48-1.33 (m, 1H), 1.40 (s, 9H), 1.31-1.16 (m, 1H), 1.08-0.92 (m, 1H), 0.95 (s, 9H), 0.77-0.62 (m, 1H), −1.79 (s, 3H), −1.93 (s, 3H). $^{13}$C{$^1$H} NMR (CDCl$_3$): δ 150.30, 147.62, 140.00, 132.05, 129.17, 127.31, 126.95, 126.75, 124.03, 123.70, 122.93, 122.79, 120.91, 120.54, 119.29, 117.90, 116.35, 115.93, 112.41, 111.17, 109.62, 101.41, 99.72, 76.78, 57.85, 43.58, 38.06, 37.13, 35.47, 34.72, 31.56, 30.72, 29.02, 28.27, 27.36, 26.91, 26.70.

Comparative Complex 1 (CC1):

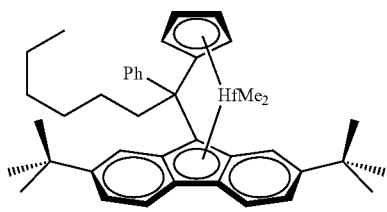

(Phenyl)(1-hexyl)methylene(cyclopentadienyl)(2,7-di-tert-butylfluoren-9-yl)hafnium dimethyl Step 1: 6-Phenyl-6-hexylfulvene

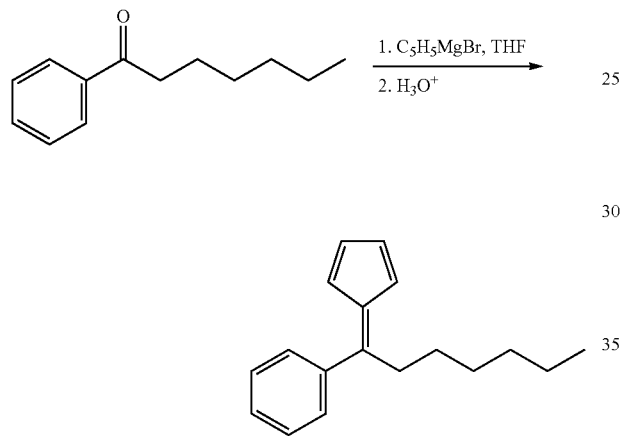

Step 2: (Phenyl)(1-hexyl)methylene(cyclopentadienyl)(2,7-di-tert-butylfluoren-9-yl)hafnium dichloride

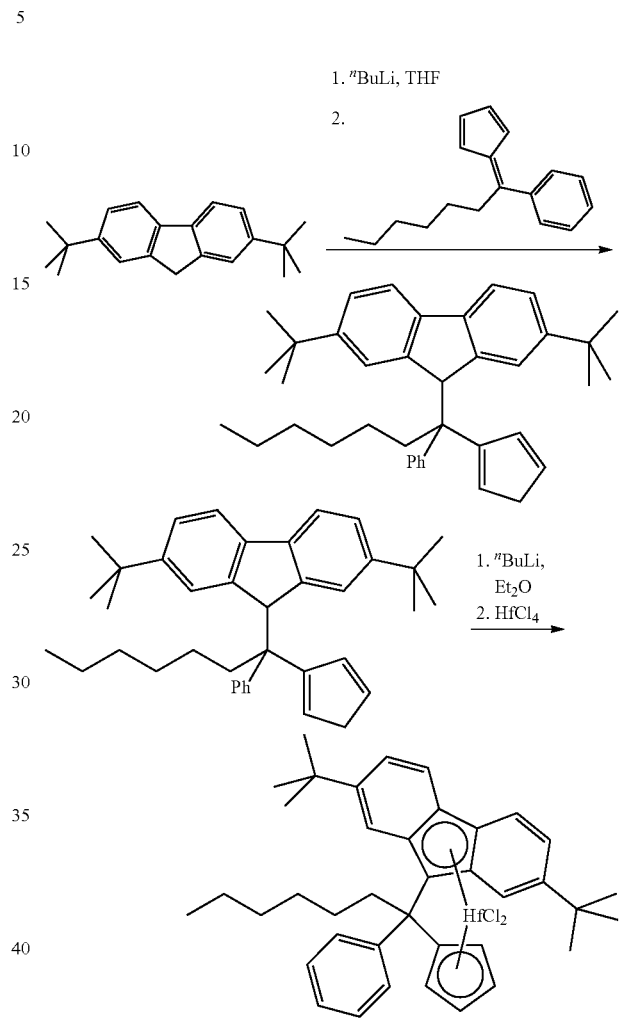

To a solution of 23.8 g (125.1 mmol) of 1-phenylheptan-1-one in 50 ml of THF cooled in an ice-bath, a solution of 25.4 g (150 mmol, 1.2 equiv.) of cyclopentadienylmagnesium bromide in 150 ml of THF was added dropwise. The resulting mixture was refluxed for 3 h, then stirred overnight at room temperature, then cooled in an ice-bath and then quenched with 10% HCl to pH~5-6. This mixture was extracted with 3×150 ml of hexane; the combined organic extract was dried over $Na_2SO_4$ and then evaporated to dryness to give a dark-red oil. The product was isolated by flash-chromatography on silica gel 60 (40-63 μm; eluent: hexane-ethyl acetate=100:1, vol.). This procedure gave 14.25 g (48%) of 6-phenyl-6-hexylfulvene as reddish oil.

Anal. calc. for $C_{18}H22$: Cl, 90.70; H, 9.30. Found: Cl, 90.87; H, 9.27.

$^1$H NMR ($CDCl_3$): δ 7.37-7.30 (m, 5H), 6.63 (ddd, J=5.3 Hz, J=2.0 Hz, J=1.5 Hz, 1H), 6.55 (ddd, J=5.3 Hz, J=2.0 Hz, J=1.5 Hz, 1H), 6.46 (ddd, J=5.3 Hz, J=2.0 Hz, J=1.5 Hz, 1H), 6.10 (ddd, J=5.3 Hz, J=2.0 Hz, J=1.5 Hz, 1H), 2.90 (t, J=7.6 Hz, 2H), 1.47-1.36 (m, 2H), 1.34-1.15 (m, 6H), 0.83 (t, J=6.9 Hz, 3H). $^{13}C\{^1H\}$ NMR ($CDCl_3$): δ 154.81, 143.31, 140.87, 131.71, 131.32, 129.42, 127.97, 127.73, 123.86, 120.90, 36.25, 31.51, 29.54, 29.13, 22.46, 13.97.

To a solution of 14.88 g (53.44 mmol) of 2,7-di-tert-butylfluorene in 200 ml of THF cooled to −50° C. 21.4 ml (53.5 mmol) of 2.5 M $^n$BuLi in hexanes was added in one portion. This mixture was stirred, overnight at room temperature. The resulting reddish solution was cooled to −50° C., and a solution of 14.25 g (59.78 mmol) of 6-phenyl-6-hexylfulvene in 200 ml of THF was added in one portion. After stirring overnight at room temperature the dark-red reaction mixture was cooled in an ice-bath and then quenched with a solution of 5 ml of 12 M HCl in 200 ml of water. The resulting yellow mixture was extracted with 400 ml of dichloromethane. The organic layer was separated, and the aqueous one was extracted with 150 ml of dichloromethane. The combined organic extract was dried over $Na_2SO_4$ and filtered through a pad of silica gel 60 (40-63 μm) which was additionally washed by 2×50 ml of dichloromethane. The combined filtrate was evaporated to dryness to give 29.1 g of phenyl-(1-hexyl)-cyclopentadienyl-(2,7-di-tert-butylfluoren-9-yl)methane which was used without further purification. To a solution of 16.2 g (31.35 mmol) of phenyl-(1-hexyl)-cyclopentadienyl-(2,7-di-tert-butylfluorenyl)methane (as prepared above) in 250 ml of ether cooled to −78° C. 25.0 ml (62.5 mmol) of 2.5 M $^n$BuLi in hexanes was added in one portion. The formed mixture was stirred overnight at room temperature and then cooled to −50° C., and 10.04 g (31.35 mmol) of HfCl$_4$ was added. The obtained mixture was stirred for 24 h at room temperature and then evaporated to dryness. The residue was stirred with 200 ml of warm toluene, and the formed suspension was filtered through a glass frit (G4). The filtrate was evaporated to ca. 40 ml. Yellow crystalline material precipitated from this mixture over a week at −30° C. was separated, washed with 3×15 ml of a mixture of toluene and hexane (1:3, vol.) and dried in vacuum. This procedure gave 14.2 g (59%) of (phenyl)(1-hexyl)methylene(cyclopentadienyl)(2,7-di-tert-butylfluoren-9-yl)-]hafnium dichloride.

Anal. calc. for C$_{39}$H$_{46}$Cl$_2$Hf: Cl, 61.30; H, 6.07. Found: Cl, 61.53; H, 6.26.

$^1$H NMR (CDCl$_3$): δ 8.01 (d, J=8.9 Hz, 1H), 7.95 (d, J=8.9 Hz, 1H), 7.82 (dm, J=7.9 Hz, 1H), 7.70 (s, 1H), 7.66-7.58 (m, 2H), 7.58-7.52 (m, 1H), 7.52-7.46 (m, 1H), 7.44-7.36 (m, 2H), 6.36-6.30 (m, 1H), 6.23-6.17 (m, 1H), 6.13 (s, 1H), 5.80-5.74 (m, 1H), 5.55-5.49 (m, 1H), 3.13-2.97 (m, 1H), 2.80-2.65 (m, 1H), 1.64-1.44 (m, 3H), 1.40 (s; 9H), 1.36-1:18 (m, 5H), 0.99 (s, 9H), 0.85 (t, J=7.9 Hz, 3H). $^{13}$C{$^1$H} NMR (CDCl$_3$,): δ 152.11, 149.53, 143.32, 130.53, 128.46, 128.26, 127.17, 127.05, 124.17, 124.14, 123.97, 123.49, 122.63, 120.25, 119.84, 119.65, 118.84, 118.79, 117.87, 116.58, 114.58, 99.64 (two resonances), 77.83, 53.68, 41.28, 35.42, 34.84, 31.88, 31.11, 30.51, 29.75, 24.03, 22.63, 14.05.

Step 3: (Phenyl)(1-hexyl)methylene(cyclopentadienyl)(2,7-di-tert-butylfluoren-9-yl)hafnium dimethyl

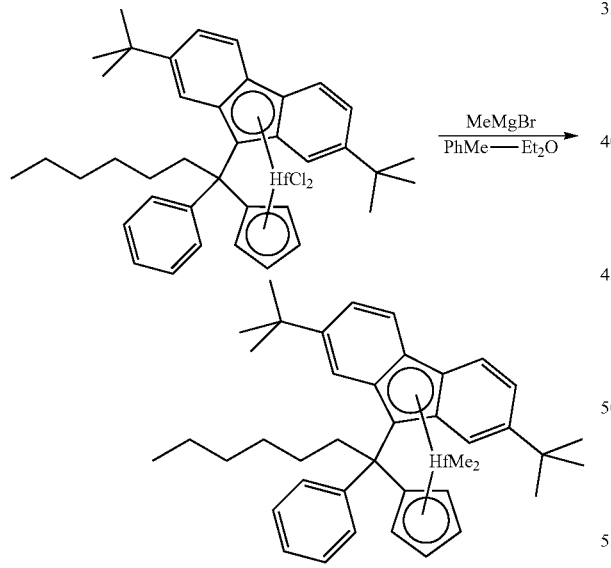

To a solution of 3.82 g (5.0 mmol) of (phenyl)(1-hexyl)methylene(cyclopentadienyl)(2,7-di-tert-butylfluoren-9-yl) hafnium dichloride in a mixture of 50 ml of toluene and 50 ml of ether 7.0 ml (14.77 mmol) of 2.11 M MeMgBr in ether was added. The resulting mixture was refluxed for 30 min and then evaporated to ca. 25 ml. The obtained solution was heated to 80-90° C. and filtered while hot through glass frit (G3) to remove insoluble magnesium salts. The filter cake was additionally washed with 2×20 ml of toluene. The combined filtrate was evaporated to dryness, and 20 ml of hexane was added to the residue. The resulting suspension was filtered once again through a glass frit (G4). The filtrate was evaporated to dryness, and the residue was dissolved in 7 ml of hexane. Yellow powder precipitated from this solution overnight at −40° C. was collected and dried in vacuum. This procedure gave 2.55 g (71%) of pure (phenyl)(1-hexyl)methylene(cyclopentadienyl)(2,7-di-tert-butylfluoren-9-yl)hafnium dimethyl.

Anal. calc. for C$_{41}$H$_{52}$Hf: Cl, 68.08; H, 7.25. Found: Cl, 68.11; H, 7.46.

$^1$H NMR (CDCl$_3$): δ 8.07 (d, J=8.9 Hz, 1H), 7.98 (d, J=8.9 Hz, 1H), 7.81 (dm, J=7.9 Hz, 1H), 7.63-7.56 (m, 2H), 7.53-7.43 (m, 2H), 7.38-7.30 (m, 3H), 6.28-6.21 (m, 1H), 6.14-6.08 (m, 1H), 6.03 (s, 1H), 5.65-5.59 (m, 1H), 5.34-5.28 (m, 1H), 2.92-2.81 (m, 1H), 2.59-2.48 (m, 1H), 1.52-1.40 (m, 3H), 1.38 (s, 9H), 1.34-1.17 (m, 5H), 0.97 (s, 9H), 0.84 (t, J=7.0 Hz, 3H), −1.76 (s, 3H), −1.90 (s, 3H). $^{13}$C{$^1$H} NMR (CDCl$_3$): δ 150.18, 147.73, 144.31, 130.72, 128.04, 127.90, 127.20, 126.59, 124.49, 123.74, 122.90, 122.73, 121.01, 120.61, 119.11, 117.56, 116.32, 115.83, 112.85, 111.08, 109.58, 100.94, 100.57, 76.51, 53.50, 41.19, 38.16, 37.39, 35.32, 34.75, 31.93, 31.35, 30.75, 29.86, 24.12, 22.68, 14.08.

Comparative Complex 2 (CC2):

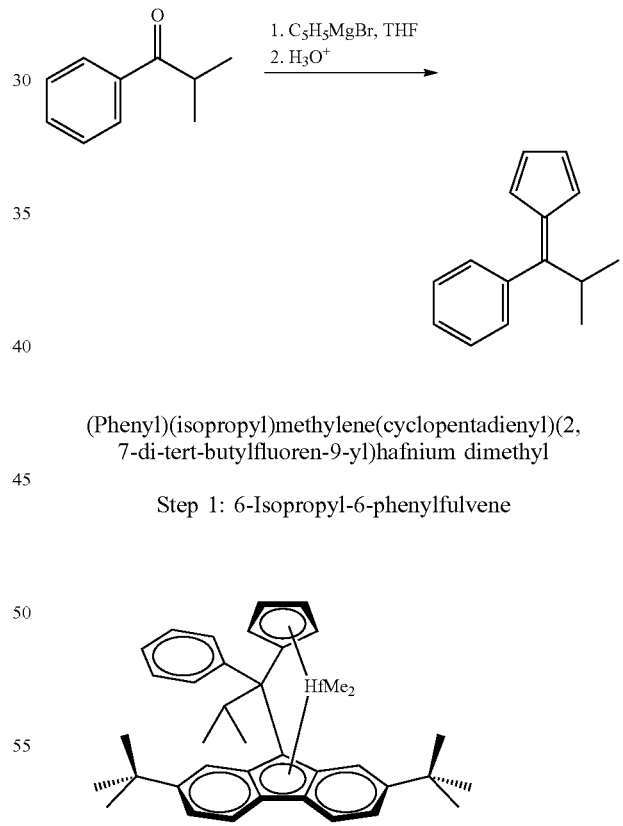

(Phenyl)(isopropyl)methylene(cyclopentadienyl)(2,7-di-tert-butylfluoren-9-yl)hafnium dimethyl Step 1: 6-Isopropyl-6-phenylfulvene To a solution of 14.82 g (100 mmol) of isopropyl phenyl ketone in 40 ml of THF cooled in an ice-bath a solution of 20.3 g (120 mmol, 1.2 equiv.) of cyclopentadienylmagnesium bromide in 120 ml of THF was added dropwise. The resulting mixture was refluxed for 3 h, then stirred overnight at room temperature, finally, cooled in an ice-bath and quenched with 10% HCl to pH~5-6. This mixture was extracted with 3×150 mi of hexane, and the combined organic extract was dried over Na$_2$SO$_4$. Removal of the solvent under vacuum gave a dark-red oil. The product was isolated by flash-chromatography on silica gel 60 (40-63 μm; eluent: hexane). This procedure gave 8.32 g (42%) of 6-isopropyl-6-phenylfulvene as a light orange oil, which completely crystallized during storage at −30° C.

Anal. calc. for C$_{15}$H$_{16}$: Cl, 91.78; H, 8.22. Found: Cl, 92.00; H, 8.41.

$^1$H NMR (CDCl$_3$): δ 7.36-7.30 (m, 3H), 7.21-7.15 (m, 2H), 6.70 (ddd, J=5.3 Hz, J=1.9 Hz, J=1.5 Hz, 1H), 6.54 (ddd, J=5.3 Hz, J=1.9 Hz, J=1.5 Hz, 1H), 6.37 (ddd, J=5.3 Hz, J=1.9 Hz, J=1.5 Hz, 1H), 5.77 (ddd, J=5.3 Hz, J=1.9 Hz, J=1.5 Hz, 1H), 3.50 (sept, J=7.0 Hz, 1H), 1.14 (d, J=7.0 Hz, 6H). $^{13}$C{$^1$H} NMR (CDCl$_3$): δ 159.82, 143.03, 138.92, 132.14, 130.72, 129.20, 127.19, 126.98, 124.36, 120.22, 33.72, 22.13.

Step 2: (Phenyl)(isopropyl)methylene(cyclopentadienyl)(2,7-di-tert-butylfluoren-9-yl)hafnium dichloride residue was triturated with 70 ml of n-hexane. Orange-yellow precipitate was filtered to give 5.80 g (ca. 19%) of (phenyl)(isopropyl)methylene(cyclopentadienyl)(2,7-di-tert-butylfluoren-9-yl)hafnium dichloride with ca. 90% purity. The analytically pure sample (2.51 g, 8%) was obtained by recrystallization of crude product from toluene.

Anal. calc. for C$_{36}$H$_{40}$Cl$_2$Hf: Cl, 59.88; H, 5.58. Found: Cl, 60.07; H, 5.73.

$^1$H NMR (CDCl$_3$): δ 8.01 (d, J=8.8 Hz, 1H), 7.95 (d, J=8.9 Hz, 1H), 7.78 (dm, J=7.8 Hz, 1H), 7.69 (s, 1H), 7.62 (d, J=8.9 Hz, 1H), 7.59-7.51 (m, 2H), 7.49 (dd, J=8.8 Hz, J=1.2 Hz, 1H), 7.47-7.36 (m, 2H), 6.37-6.30 (m, 1H), 6.22-6.16 (m, 1H), 5.99 (br.s, 1H), 5.75-5.69 (m, 1H), 5.57-5.51 (m, 1H), 3.69 (sept, J=6.7 Hz, 1H), 1.39 (s, 9H), 1.31 (d, J=6.7 Hz, 3H), 1.05 (d, J=6.7 Hz, 3H), 0.97 (s, 9H). $^{13}$C{$^1$H} NMR (CDCl$_3$): δ 152.22, 149.49, 137.95, 131.85, 129.31, 127.77, 127.42, 124.11, 124.06, 123.96, 123.43, 122.28, 120.46, 119.93, 119.81, 118.99, 118.56, 118.52, 116.70, 115.03, 100.10, 99.06, 78.64, 58.17, 35.40, 34.84, 32.74, 31.11, 30.51, 18.34, 17.89.

Step 3: (Phenyl)(isopropyl)methylene(cyclopentadienyl)(2,7-di-tert-butylfluoren-9-yl)hafnium dimethyl

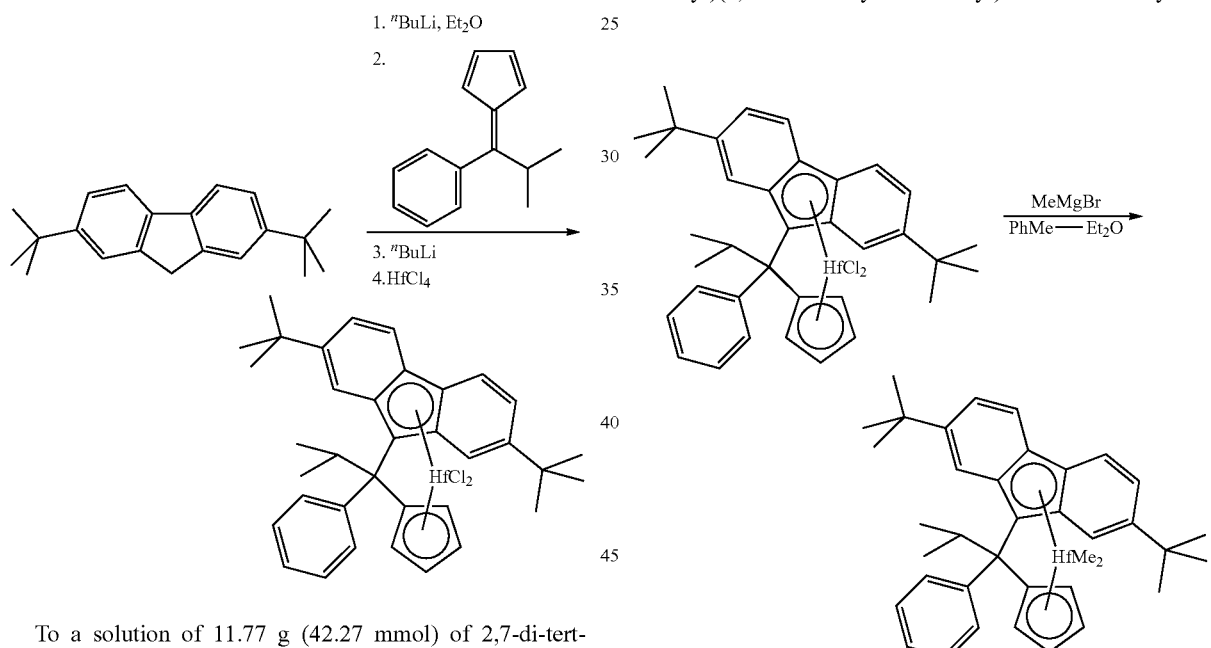

To a solution of 11.77 g (42.27 mmol) of 2,7-di-tert-butylfluorene in 250 ml of ether cooled to −50° C. 17.4 ml (42.28 mmol) of 2.43 M $^n$BuLi in hexanes was added in one portion. This mixture was stirred overnight at room temperature. The resulting orange solution was cooled to −50° C., and a solution of 8.30 g (42.29 mmol) of 6-isopropyl-6-phenylfulvene in 150 ml of ether was added in one portion. After stirring overnight at room temperature the dark-red reaction mixture was cooled to −50° C., and 17.4 ml (42.28 mmol) of 2.43 M $^n$BuLi in hexanes was added in one portion. This mixture was stirred overnight at room temperature. The resulting dark-red solution was cooled to −50° C., and 13.55 g (42.3 mmol) of HfCl$_4$ was added. The formed mixture was stirred for 24 h at room temperature, then it was evaporated to dryness, and the residue was treated with 150 ml of warm toluene. This mixture was filtered while hot through glass frit (G4), the filtrate was evaporated to ca. 50 ml, and 80 ml of n-hexane was added to the residue. Precipitated solid was filtered and discarded. The mother liquor was evaporated almost to dryness, and the To a solution of 3.3 g (ca. 4.6 mmol) of crude (phenyl)(isopropyl)methylene(cyclo-pentadienyl)(2,7-di-tert-butylfluoren-9-yl)hafnium dichloride (residue after recrystallization from toluene) in a mixture of 30 ml of toluene and 15 ml of ether, 6.5 ml (17.55 mmol) of 2.7 M MeMgBr in ether was added. The resulting mixture was stirred overnight at room temperature. Most of ether was distilled off, and the resulting mixture was filtered through glass frit (G4) to remove insoluble magnesium salts. The filtrate was evaporated to ca. 15 ml and filtered again through glass frit (G4). The mother liquor was evaporated to ca. 5 ml, 15 ml of n-hexane was added, and the resulting slightly turbid solution was filtered through glass frit (G4). Yellow powder precipitated from the filtrate overnight at −30° C. was collected and dried in vacuum. This procedure gave 1.46 g (ca. 47%) of (phenyl)(isopropyl)methylene(cyclopentadienyl)(2,7-di-tert-butylfluoren-9-yl) hafnium dimethyl.

Anal. calc. for $C_{38}H_{48}Hf$: Cl, 66.99; H, 6.81. Found: Cl, 67.14; H, 7.02.

$^1$H NMR (CDCl$_3$): δ 8.09 (d, J=8.8 Hz, 1H), 7.99 (d, J=8.8 Hz, 1H), 7.75 (dm, J=7.9 Hz, 1H), 7.57 (br.s, 1H), 7.56-7.44 (m, 3H), 7.39-7.29 (m, 3H), 6.27-6.23 (m, 1H), 6.13-6.08 (m, 1H), 5.88 (br.d, J=1.0 Hz, 1H), 5.59-5.55 (m, 1H), 5.33-5.29 (m, 1H), 3.55-3.43 (m, 1H), 1.38 (s, 9H), 1.22 (d, J=6.7 Hz, 3H), 0.97-0.93 (s and d, sum 12H), −1.79 (s, 3H), −1.92 (s, 3H).

Complex Elemental Analysis (ICP Method):

| Complex | Hf (%) purity | Zr (%) impurity |
|---|---|---|
| CC1 | 99.61 | 0.39 |
| IC | 99.51 | 0.49 |

Comparative Example C0

Diphenylmethylene(cyclopentadienyl)(2,7-di-tert-butylfluoren-9-yl)hafnium dimethyl Diphenylmethylene(cyclopentadienyl)(2,7-di-tert-butylfluoren-9-yl)hafnium dichloride was synthesized according to the literature: Hopf, A, Kaminsky, W., Catalysis Communications 2002; 3:459.

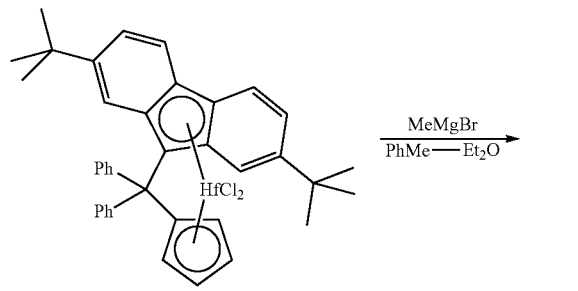

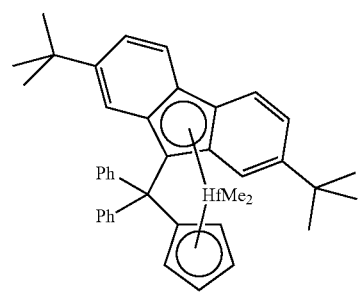

To a solution of 3.78 g (5.0 mmol) of Diphenylmethylene (cyclopentadienyl)(2,7-di-tert-butylfluoren-9-yl)hafnium dichloride in a mixture of 50 ml of toluene and 50 ml of ether, 7.0 ml (14.77 mmol) of 2.11 M MeMgBr in ether was added. The resulting mixture was refluxed for 30 min and then evaporated to ca. 25 ml. The obtained mixture was heated to 80-90° C. and filtered while hot through glass frit (G4) to remove insoluble magnesium salts. The filter cake was additionally washed with 5×20 ml of warm hexane. The combined filtrate was evaporated to ca. 5 ml, and then 20 ml of hexane was added to the residue. Yellow powder precipitated from this solution was collected and dried in vacuum. This procedure gave 3.14 g (88%) of pure diphenylmethylene(cyclopentadienyl)(2,7-di-tert-butylfluoren-9-yl)hafnium dimethyl.

Anal. calc. for $C_{41}H_{44}Hf$: Cl, 68.85; H, 6.20. Found: Cl, 69.10; H, 6.37.

$^1$H NMR (CDCl$_3$): δ 8.07 (d, J=8.9 Hz, 2H), 7.95 (br.d, J=7.9 Hz, 2H), 7.85 (br.d, J=7.9 Hz, 2H), 7.44 (dd, J=8.9 Hz, J=1.5 Hz, 2H), 7.37 (td, J=7.6 Hz, J=1.2 Hz, 2H), 7.28 (td, J=7.6 Hz, J=1.2 Hz, 2H), 7.24-7.17 (m, 2H), 6.26 (s, 2H), 6.20 (t, J=2.7 Hz, 2H), 5.45 (t, J=2.7 Hz, 2H), 1.03 (s, 18H), −1.90 (s, 6H). $^{13}$C{$^1$H} NMR (CDCl$_3$,): δ 148.46, 145.75, 129.69, 128.63, 128.46, 126.73, 126.54, 123.29, 122.62, 120.97, 118.79, 116.09, 111.68, 107.76, 101.56, 76.47, 57.91, 37.61, 34.88, 30.84.

b) Polymerization Procedure

Polymerization tests have been performed in 125 mL reactors equipped with a bottom valve, at 160° C. and 30 barg as total pressure. Different C8/C2 weight ratios in the liquid phase and different catalyst loadings have been tested to find the optimal amount to guarantee almost constant temperature and pressure during the 10 minutes of polymerization.

Activation Procedure

N,N-dimethylanilinium tetrakis(pentafluorophenyl) borate has been used for all experiments.

TEA (7×10$^{-2}$ mol/kg in Isopar E) has been used as the scavenger for all the experiments and its amount has been optimised together with the B/Hf ratio based on a specific design of experiments (DoE).

Activation is carried out by dissolving separately the complex and the activator in 4 mL of toluene. The borate solution is then injected in the reactor feeding line followed by the complex solution and the two are let in contact for few seconds before the injection into the reactor by nitrogen overpressure.

Polymerization Procedure

The reactor is filled with the desired amount of solvent (isopar E), scavenger (optimised amount 0.035 mmol TEA) and 1-octene. Solvent and monomers amounts are chosen to have an initial liquid volume at the polymerization conditions of 80 mL.

The reactor is then heated up and carefully pressurised with ethylene (25-28 bar-g). When conditions are stable, the ethylene pressure is adjusted to 30 bar-g and the mixture is allowed to stir at 750 rpm during 10 minutes in order to determine the residual ethylene uptake.

After this time the catalyst (dissolved with 4 mL of toluene) and the cocatalyst (also dissolved with 4 mL toluene) are combined in the injection line and immediately injected in the reactor by nitrogen overpressure. Pressure is then kept constant by feeding ethylene and after 10 minutes polymerization is quenched by adding a killing agent (either EtOH or CO2). Then the reactor is vented, the temperature is decreased and the vessel is opened. The solution is discharged in an aluminium pan containing few milligrams (~500 ppm related to the copolymer produced) of Irganox 1076. The pan is then placed under a well-ventilated fume hood until the volatiles are evaporated. The collected residual material is analysed by HT-SEC and DSC according to the methods reported in the polymer characterisation paragraph.

TABLE 1

Ethylene/1-octene solution co-polymerisation productivity results
Inventive Examples IE1-IE3 and Comparative Examples CE1-CE6

| Ex | Complex | Productivity $kg_{polymer}/g_{Complex}$ in 10 min | Average. C8/C2 ratio in solution wt/wt | C8 in polymer (NMR) % wt | Reactivity ratio C8/C2 | GPC Mw kDa | PDI |
|---|---|---|---|---|---|---|---|
| IE1 | IC | 56.0 | 1.3 | 21.7 | 0.21 | 153 | 3.2 |
| IE2 | IC | 74.4 | 1.6 | 28.1 | 0.24 | 121 | 3.3 |
| IE3 | IC | 111.2 | 2.0 | 33.1 | 0.25 | 76 | 2.8 |
| CE1 | CC1 | 24.3 | 1.1 | 18.8 | 0.21 | 187 | 3.3 |
| CE2 | CC1 | 25.3 | 1.1 | 20.0 | 0.23 | 185 | 3.4 |
| CE3 | CC1 | 50.6 | 1.7 | 26.9 | 0.21 | 120 | 3.1 |
| CE4 | CC2 | 24.7 | 1.1 | 17.6 | 0.19 | 202 | 3.8 |
| CE5 | CC2 | 57.2 | 1.7 | 25.3 | 0.19 | 148 | 3.3 |
| CE6 | CC2 | 39.7 | 2.2 | 29.3 | 0.19 | 132 | 3.0 |

Table 1 shows based on the productivity results, that the cyclohexyl as substituent in the bridge (IC) results in higher productivity compared to hexyl (CC1) or isopropyl (CC2) as substituent in the bridge when activated using borate AB as co-catalyst (FIG. 1). The catalyst system IC/AB displayed highest productivity with 111 kg-PO/g-cat for a catalyst loading of 0.07 mg and residence time 10 min.

For same C8 content (or same average C8/C2), no significant clear differences on molecular weight capability and reactivity can be observed between the three complexes (FIGS. 2-4) The performance of the IC/AB catalyst system was further investigated by carrying out a set of experiments following the design of experiments (DoE) methodology. The two factors TEA amount and B/Hf ratio was used (see Table 2). In those set of experiments the effect on productivity and polymer properties (Mw and C8 incorporation) has been evaluated. Polymerisation temperature was 160° C. and total pressure 30 barg. Results are reported in Table 2, best productivity was obtained for 35 µmol TEA and 1.5 B/Hf molar ratio.

Solubility of the complex in aliphatic hydrocarbons is also an important property, since the complex is preferably fed into the reactor as a solution in such a solvent. This feeding mode ensures higher accuracy in the catalyst concentration in the reactor and better activation efficiency.

The solubility of the inventive complex in hexane is shown in Table 3.

TABLE 3

Solubility of hafnium complexes in hexane

| Complex | Solubility at 25° C. [wt %] | Solubility at −20° C. [wt %] |
|---|---|---|
| C0 | 2 | <1 |
| IC | 5.2 | 2.3 |

As is shown in Table 3, complex IC has a higher solubility compared to complex C0.

TABLE 2

Ethylene/1-octene solution co-polymerisation polymerisation
results for IC/AB system IE2 and IE 4 to IE12

| Ex | TEA amount µmol | B/Hf mol ratio | polymer produced g | Productivity kg PE/$g_{cat}$ in 10 min | C8 in polymer (Tg or NMR) % wt | Reactivity ratio C8/C2 | GPC Mw kDa | PDI |
|---|---|---|---|---|---|---|---|---|
| IE4 | 20 | 1.00 | 2.71 | 54.2 | 26.0 (Tg) | 0.21 | 133 | 3.1 |
| IE5 | 20 | 1.25 | 3.09 | 61.8 | nm | nm | nm | nm |
| IE6 | 20 | 1.49 | 3.68 | 73.6 | nm | nm | 96 | 3.3 |
| IE7 | 35 | 1.00 | 3.74 | 74.8 | 28.6 (Tg) | 0.25 | 121 | 3.0 |
| IE2 | 35 | 1.25 | 3.72 | 74.4 | 28.1 | 0.24 | 121 | 3.3 |
| IE8 | 35 | 1.50 | 4.61 | 92.2 | 28.9 (Tg) | 0.26 | 108 | 3.5 |
| IE9 | 50 | 1.00 | 0.90 | 18.0 | nm | nm | 151 | 3.3 |
| IE10 | 50 | 1.25 | 1.01 | 20.2 | nm | nm | 164 | 3.3 |
| IE11 | 50 | 1.50 | 1.36 | 27.2 | nm | nm | 156 | 3.4 |
| IE12 | 50 | 1.50 | 1.25 | 25.0 | 26.0 (Tg) | 0.20 | 154 | 2.8 |

The invention claimed is:

1. A catalyst system for producing ethylene copolymers in a high temperature solution process at temperatures higher than 100° C., the catalyst system comprising:
(i) a metallocene complex of formula (I)

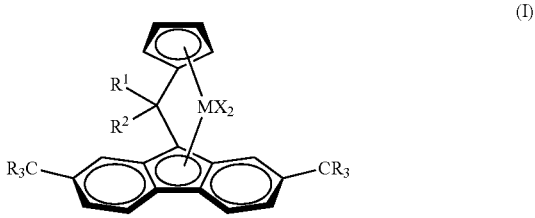

(I)

wherein
M is Hf;
each X is independently a hydrogen atom, halogen atom, $R^3$, $OR^3$, $OSO_2CF_3$, $OCOR^3$, $SR^3$, $NR^3_2$, or $PR^3_2$ group, wherein $R^3$ is a branched or unbranched, cyclic or acyclic, $C_1$-$C_{20}$-alkyl, $C_2$-$C_{20}$-alkenyl, $C_2$-$C_{20}$-alkynyl, $C_6$-$C_{20}$-aryl, $C_7$-$C_{20}$-alkylaryl, or $C_7$-$C_{20}$-arylalkyl radical; optionally containing heteroatoms belonging to groups 14-16 or is $SiR^3_3$, $SiHR^3_2$, or $SiH_2R^3$;
R are the same or different and are independently selected from the group consisting of linear or branched $C_1$-$C_6$ alkyl, $C_6$-$C_{10}$ aryl, $C_6$-$C_{20}$ alkylaryl, or $C_6$-$C_{20}$ arylalkyl groups, which do not contain heteroatoms or silicon atoms;
$R^1$ is a $C_6$ aryl group, which does not contain heteroatoms or silicon atoms;
$R^2$ is a $C_4$-$C_{10}$ cycloalkyl group of formula (II),

(II)

wherein
R' are the same or different and are independently selected from the group consisting of hydrogen and linear or branched $C_1$-$C_6$ alkyl or $C_6$-$C_{10}$ aryl; and
n is 1 to 7;
and
(ii) a boron containing cocatalyst;
wherein the catalyst system is a homogeneous or non-supported catalyst system.

2. The catalyst system according to claim 1, wherein in the formula (I):
each X is independently a halogen atom, a $R^3$, or $OR^3$ group, wherein $R^3$ is a $C_{1-6}$-alkyl, phenyl, or benzyl group;
R are the same and are linear or branched $C_1$-$C_6$ alkyl or $C_6$-$C_{10}$ aryl groups;
$R^1$ is unsubstituted phenyl or phenyl substituted by one to two $C_1$-$C_6$ alkyl groups; and
$R^2$ is a $C_4$-$C_{10}$ cycloalkyl group of formula (II), wherein:
R' are the same or different and are independently selected from the group consisting of hydrogen and linear or branched $C_1$-$C_4$ alkyl.

3. The catalyst system according to claim 1, wherein in the formula (I):
each X is independently a methyl, benzyl, or chloride group;
R are the same and are all methyl groups;
$R^1$ is phenyl, para-tolyl, or para-iso-propylphenyl; and
$R^2$ is a $C_4$-$C_8$ cycloalkyl group of formula (II), wherein:
all R' are hydrogen; and
n is 1 to 5.

4. The catalyst system according to claim 1, wherein the metallocene complex of formula (I) is selected from the group consisting of (Phenyl)(cyclohexyl)methylene(cyclopentadienyl)(2,7-di-tert-butylfluoren-9-yl)hafnium dichloride; (Phenyl)(cyclohexyl)methylene(cyclopentadienyl)(2,7-di-tert-butylfluoren-9-yl)hafnium dimethyl; (Phenyl)(cyclohexyl)methylene(cyclopentadienyl)(2,7-di-tert-butylfluoren-9-yl)hafnium dibenzyl; (Phenyl)(cyclopentyl)methylene(cyclopentadienyl)(2,7-di-tert-butylfluoren-9-yl)hafnium dichloride; (Phenyl)(cyclopentyl)methylene(cyclopentadienyl) (2,7-di-tert-butylfluoren-9-yl)hafnium dimethyl; (Phenyl)(cyclopentyl)methylene (cyclopentadienyl)(2,7-di-tert-butylfluoren-9-yl)hafnium dibenzyl; (Phenyl)(cyclobutyl) methylene(cyclopentadienyl)(2,7-di-tert-butylfluoren-9-yl)hafnium dichloride; (Phenyl)(cyclobutyl) methylene(cyclopentadienyl)(2,7-di-tert-butylfluoren-9-yl) hafnium dimethyl; (4-isopropylphenyl)(cyclohexyl)methylene(cyclopentadienyl)(2,7-di-tert-butylfluoren-9-yl) hafnium dichloride; (4-isopropylphenyl)(cyclohexyl)methylene(cyclopentadienyl)(2,7-di-tert-butylfluoren-9-yl) hafnium dimethyl; (4-isopropylphenyl)(cyclopentyl)methylene (cyclopentadienyl)(2,7-di-tert-butylfluoren-9-yl) hafnium dichloride; (4-isopropylphenyl) (cyclopentyl) methylene(cyclopentadienyl)(2,7-di-tert-butylfluoren-9-yl) hafnium dimethyl; (4-isopropylphenyl)(cyclobutyl) methylene(cyclopentadienyl)(2,7-di-tert-butylfluoren-9-yl) hafnium dichloride; (4-isopropylphenyl)(cyclobutyl) methylene(cyclopentadienyl)(2,7-di-tert-butylfluoren-9-yl) hafnium dimethyl; (3,5-di-isopropylphenyl)(cyclohexyl) methylene (cyclopentadienyl)(2,7-di-tert-butylfluoren-9-yl) hafnium dichloride; (3,5-di-isopropylphenyl) (cyclohexyl) methylene(cyclopentadienyl)(2,7-di-tert-butylfluoren-9-yl) hafnium dimethyl; (3,5-di-isopropylphenyl)(cyclopentyl) methylene(cyclopentadienyl)(2,7-di-tert-butylfluoren-9-yl) hafnium dichloride; (3,5-di-isopropylphenyl)(cyclopentyl) methylene(cyclopentadienyl)(2,7-di-tert-butylfluoren-9-yl) hafnium dimethyl; (3,5-di-isopropylphenyl)(cyclobutyl) methylene (cyclopentadienyl)(2,7-di-tert-butylfluoren-9-yl) hafnium dichloride; and (3,5-di-isopropylphenyl) (cyclobutyl)methylene(cyclopentadienyl)(2,7-di-tert-butylfluoren-9-yl)hafnium dimethyl.

5. The catalyst system as claimed in claim 1, wherein said boron containing cocatalyst comprises an anion of formula:

$$(Z)_4B^-  \quad (III)$$

where Z is an optionally substituted phenyl derivative, said substituent being a halo-$C_{1-6}$-alkyl or halide group.

6. A process for the preparation of an ethylene copolymer, the process comprising polymerizing ethylene and a $C_{4-10}$ alpha-olefin comonomer in a high temperature solution process at a temperature greater than 100° C. in the presence of the catalyst system of claim 1.

7. The process according to claim 6, wherein the polymerization is performed
a) at a polymerization temperature of at least 110° C.,
b) at a pressure in the range of 10 to 100 bar, and c) in a liquid hydrocarbon solvent selected from the group of $C_{5-12}$-hydrocarbons, which are unsubstituted or substituted by a $C_{1-4}$ alkyl group.

8. The catalyst system according to claim 2, wherein all R are the same and are a linear or branched $C_1$-$C_6$ alkyl.

9. The catalyst system according to claim 1, wherein:
the catalyst system is prepared in solution by contacting the metallocene complex of Formula (I), as a solid or as a solution, with the cocatalyst in a hydrocarbon diluent or previously dissolved in an aromatic solvent, or
the catalyst system is formed by sequentially adding the components of the catalyst system directly into the polymerization reactor.

10. The catalyst system as claimed in claim 1, wherein said boron containing cocatalyst is selected from the group consisting of triphenylcarbeniumtetrakis (pentafluorophenyl) borate, N,N-dimethylcyclohexylammoniumtetrakis (pentafluorophenyl) borate, N,N-dimethylbenzylammoniumtetrakis(pentafluorophenyl) borate, and N,N-dimethylaniliniumtetrakis(pentafluorophenyl) borate.

\* \* \* \* \*